United States Patent [19]
Yoshida et al.

[11] Patent Number: 5,267,144
[45] Date of Patent: Nov. 30, 1993

[54] ACCESS METHOD OF AN ACTUATOR AND CONTROL APPARATUS THEREFOR

[75] Inventors: Shuich Yoshida, Osaka; Mitsuo Tokura; Noriaki Wakabayashi, both of Hirakata, all of Japan

[73] Assignee: Matsushita Electric Industrial Co., Inc., Osaka, Japan

[21] Appl. No.: 716,509

[22] Filed: Jun. 17, 1991

[30] Foreign Application Priority Data

Jun. 18, 1990 [JP] Japan ................................. 2-159018
Jun. 29, 1990 [JP] Japan ................................. 2-173451

[51] Int. Cl.$^5$ ........................................... G05B 11/32
[52] U.S. Cl. ..................................... 364/174; 364/148; 395/900; 318/561
[58] Field of Search ................................. 364/153–155, 364/148, 167.01, 172, 174, 175, 426.01; 395/900, 903–905, 61; 318/561; 360/78.04, 78.06, 78.07; 369/32

[56] References Cited

U.S. PATENT DOCUMENTS 5,018,689  5/1991  Yasunobu et al. ............. 364/426.01
5,148,089  9/1992  Adachi et al. .................. 364/426.01

FOREIGN PATENT DOCUMENTS 3-117306  5/1991  Japan .............................. 364/426.01

*Primary Examiner*—Jerry Smith
*Assistant Examiner*—Steven R. Garland
*Attorney, Agent, or Firm*—Wenderoth, Lind & Ponack

[57] ABSTRACT

A target moving distance of an actuator is provided and a acceleration time of the actuator suitable for the target moving distance are calculated on the basis of a preset equation. Then, a starting position of the actuator is set. It is judged if the starting position is in the range where an unevenness of force of the actuator occurs. When the starting position is not in the range, the actuator is shifted to the starting position and then is accelerated for the acceleration time. On the other hand, when the starting position is in the range, a correction time to the acceleration time is obtained based on a fuzzy inference calculation and added to the acceleration time. The actuator is shifted to the starting position and accelerated for a corrected acceleration time which is obtained by the fuzzy inference calculation.

4 Claims, 19 Drawing Sheets

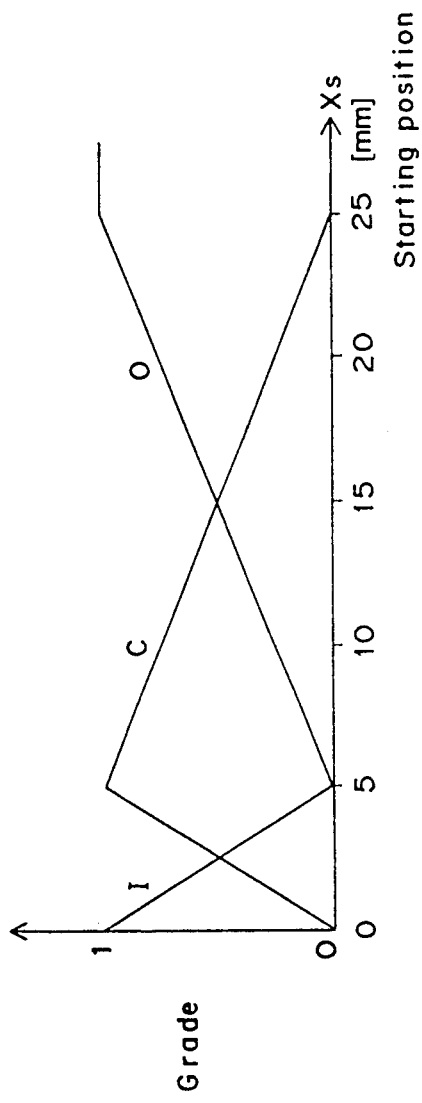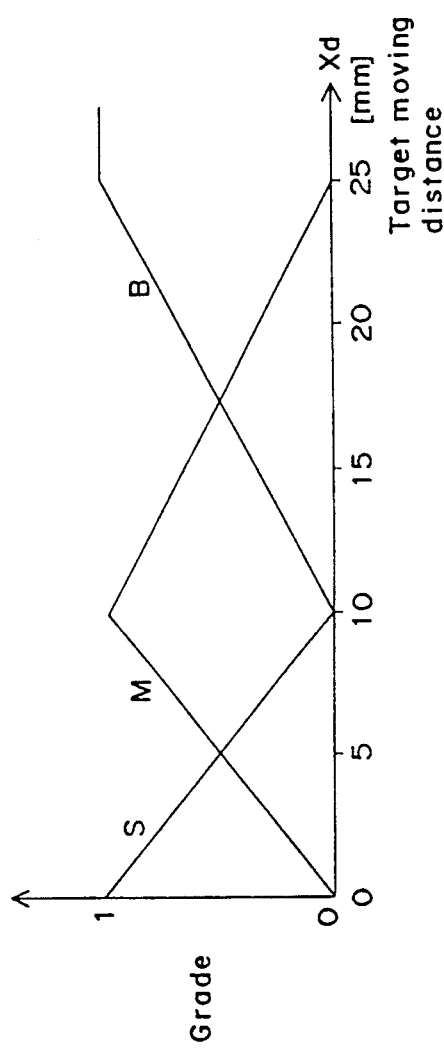

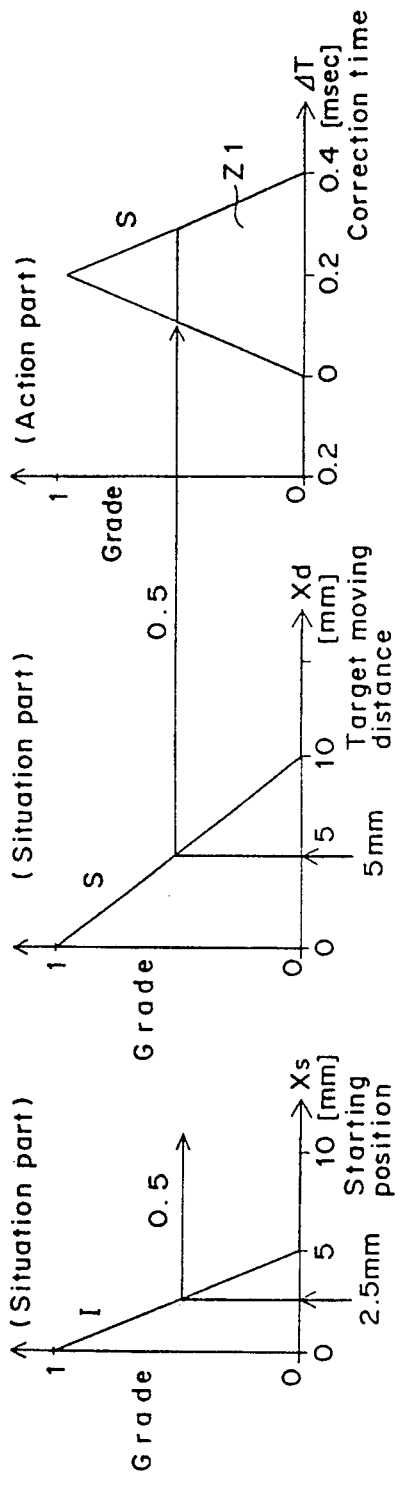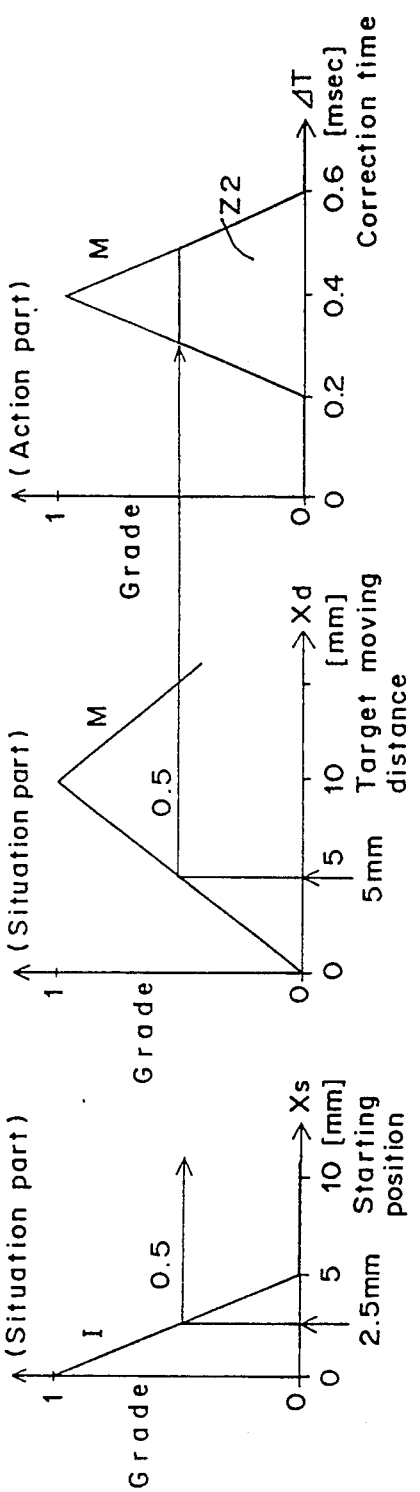

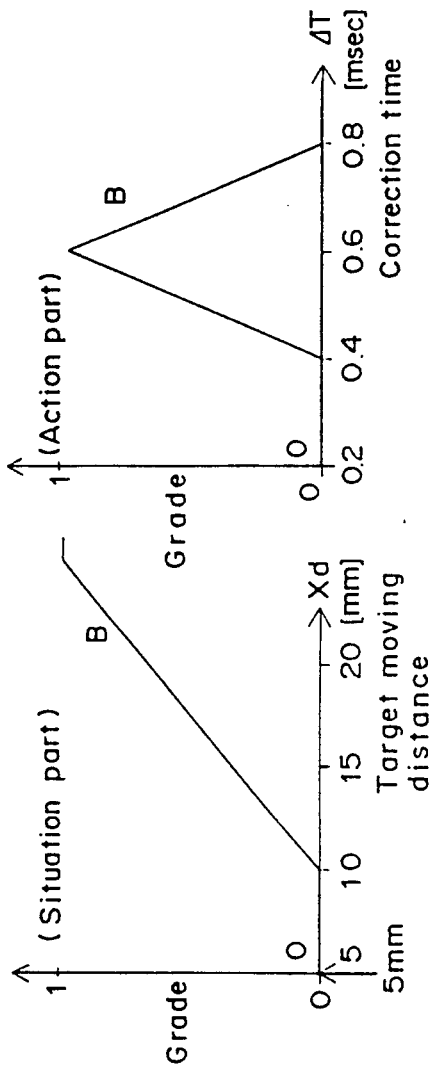
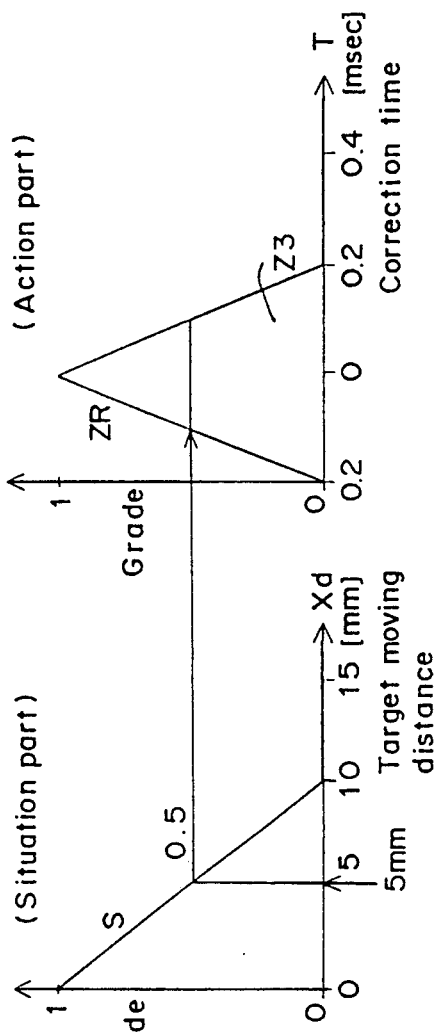
Fig. 4(c-1)  Fig. 4(c-2)  Fig. 4(c-3)
Fig. 4(d-1)  Fig. 4(d-2)  Fig. 4(d-3)

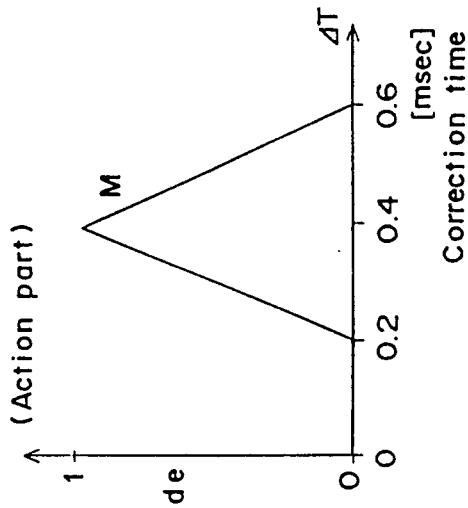
Fig. 4(e-3) (Action part)
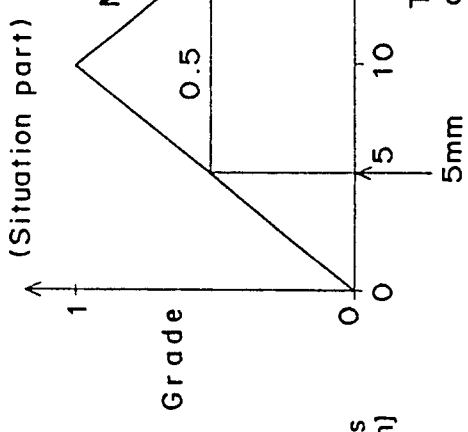
Fig. 4(e-2) (Situation part)
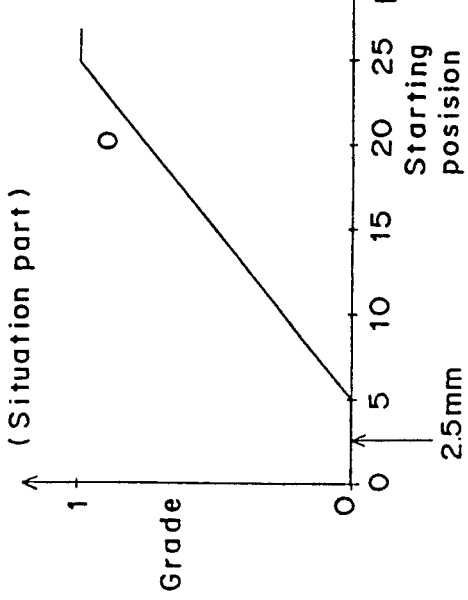
Fig. 4(e-1) (Situation part)

ACCESS METHOD OF AN ACTUATOR AND CONTROL APPARATUS THEREFOR

BACKGROUND OF THE INVENTION

1. Field of the Invention

The present invention relates to an access method of an actuator used in a disk memory apparatus and so on, and a control apparatus therefor, and more particularly to an access method of the actuator for moving it from a starting position to a predetermined target position with a high speed and a control apparatus therefor.

2. Description of the Prior Art

Recently, the recording capacity of an information recording-reproducing apparatus such as a magnetic disk apparatus or an optical disk apparatus has been significantly increased. Accordingly, improvement of the access speed of a transducer to a target track of the magnetic disk or the optical disk is required in the recording or reproducing of data. A Bang-Bang driving method is known as an access control method of an actuator for positioning the transducer mounted on the actuator of the information recording-reproducing apparatus. This method is an open loop control system, and is a minimum time control method which applies an acceleration command and a deceleration command alternately to the actuator.

FIG. 13 is a diagram of an actuator driving circuit of an access control apparatus in prior art. In FIG. 13, reference numeral 101 designates an operational amplifier, and reference numeral 102 designates a power amplifier including transistors 102A and 102B. Reference numeral 103 represents a magnetic coil 103 having an inductance 104 and a resistance 105 which are connected in series. Reference numeral 106 is a current detection resistor which detects a current flowing through the magnetic coil 103. A counter electromotive voltage which is generated in the magnetic coil 103 is represented by a generator 107. A bang-bang command signal 100 of a rectangular waveform is applied to the non-invert input (+) of the operational amplifier 101. The output of the operational amplifier 101 is amplified by the power amplifier 102 and is applied to one terminal of the magnetic coil 103 of an actuator. The other terminal of the magnetic coil 103 is grounded through the current detection resistor 106.

In the driving circuit, the other terminal of the magnetic coil 103 is coupled to the invert input (−) of the operational amplifier 101, and thereby the current flowing through the magnetic coil 103 is in proportional to the input voltage at the non-invert (+) of the operational amplifier 101, and a constant current operation is realized within a linear operation range of the driving circuit. On the other hand, in the event that a sufficiently large input voltage is applied to the non-invert input (+) of the operational amplifier 101 such as the Bang-Bang signal 100 shown in FIG. 13, the operational amplifier 101 is saturated, and the driving circuit becomes an open loop state. Consequently, transistors 102A and 102B become alternately conducting states, and power source voltages +Ve and −Ve are alternately applied to the magnetic coil 103. This operation is a constant voltage operation.

It should be noted that, in the following explanation, the influences from the inductance 104 of magnetic coil 103 and from the counter electromotive voltage in the magnetic coil 103 caused by the movement of the actuator are not considered, because they are very small.

FIG. 14 is a side view of a direct current driving actuator generally called a voice coil motor. In FIG. 14, reference numeral 111 is a magnetic coil, reference numeral 112 is a magnet which provides a bias magnetic field to the magnetic coil 111, reference numerals 113 and 114 are respectively center and outer yokes which receive magnetic flux produced at the magnet and constitute a magnetic circuit. The center and outer yokes 113 and 114 are made of materials which have relatively high relative permeability such as iron. The operating principle of the actuator in the FIG. 14 is as follows. When magnetic flux caused by the magnet 112 crosses in chain-form a current which flows through the magnetic coil 111, magnetic coil 111 moves to the direction directed by an arrow in FIG. 14 in accordance with the left-hand theory by J. A. Fleming.

Scatter of dimension on processing the yokes 113, 114 and the magnet 112 or unevenness of magnetization of the magnet 112 sometimes causes dispersion of the magnetic power for moving the magnetic coil 111 depending on the position or the moving direction of the magnetic coil 111.

FIG. 15 is a distribution diagram showing an example of unevenness of the magnetic force for moving the magnetic coil 111 depending on the position of the magnetic coil 111. In FIG. 15, an abscissa is graduated by the distances from a reference point to the positions of the magnetic coil 111 which is a movable portion of the actuator. An ordinate is graduated by the force, that is, the force constant of the actuator which is produced in the actuator, when the magnetic coil 111 is disposed in respective positions, and a unit amount of current flows through the magnetic coil 111. When the magnetic coil 111 is located in the range of X where 5 mm = Xu1 < X < Xu2 = 20 mm, the produced force is almost even. However, when the magnetic coil 111 is not in the above range as the magnetic coil 111 moves toward either end of the magnetic circuit, and the produced force becomes weaker. It is understood that the unevenness of the produced force occurs.

FIG. 16 (a) is a diagram representing a current I which flows through the magnetic coil 103, FIG. 16 (b) is a diagram representing the travel velocity V of the actuator and FIG. 16 (c) is a diagram representing the travel distance X of the actuator. An abscissa of each diagram is graduated by time. Referring to FIGS. 16 (a), 16 (b) and 16 (c), the dotted lines represent the operation of the actuator when it is not influenced by the unevenness of the force of the magnetic coil 111 (for example, when the actuator is accessed in the range of X where 5 mm < X < 10 mm, as shown in FIG. 15), and the solid lines represent the operation of the actuator when it is influenced by the dispersion of the force (for example, when the actuator is accused in the range of X where 0 mm < X < 5 mm).

When the operation of the actuator is not influenced by the unevenness of the force, the travel velocity V of the actuator is evaluated by an integral of the current I which is applied to the actuator, and the travel distance X is also evaluated by the double-integral of the current. Consequently, an acceleration time length and a deceleration time length in which the actuator is accelerated or decelerated are calculated according to the travel velocity V and the travel distance X with an acceleration being given by the amplitude of the Bang-Bang command signal 100. To the contrary, when the operation of the actuator is influenced by the unevenness of the force, it is very difficult to quickly infer the acceleration time and the deceleration time with high precision so that the travel velocity V becomes zero at a target position of the actuator. Consequently, according to the conventional access method such as Bang-Bang driving method, an access control apparatus with a high precision and a high speed have not been realized.

SUMMARY OF THE INVENTION

Therefore, the object of the present invention is to provide an access method of an actuator of a disk memory apparatus etc. and a control apparatus therefor which take into consideration the influence of the dispersion of the force for moving the actuator, infer the proper access command signal with a high precision, high speed and easiness, and realizes high speed access of the actuator with a high precision.

In order to achieve the aforementioned object, there is provided an access method of an actuator wherein the actuator is accessed by an access command signal including data of an acceleration, an acceleration time, a deceleration and a deceleration time of the actuator in order to drive the actuator from a starting position thereof for a predetermined target moving distance, comprising the steps of:

performing a fuzzy inference calculation based on plural rules which have the acceleration, the acceleration time, the deceleration and the deceleration time represented by the access command signal and the starting position of the actuator as input variables, and have a correction value of at least one of the acceleration, the acceleration time, the deceleration and the deceleration time represented by data of the access command signal as an output variable; and correcting the data of the access command signal based on the correction value obtained by the above fuzzy inference calculation.

Also, there is provided an access method of an actuator wherein the actuator is accessed by an access command signal including data of an acceleration, an acceleration time, a deceleration and a deceleration time of the actuator in order to drive the actuator from a starting position thereof for a predetermined target moving distance, comprising the steps of:

performing a fuzzy inference calculation based on plural rules which have the starting position of the actuator and the target moving distance to be accessed by the actuator as input variables, and have a correction value of at least one of the acceleration, the acceleration time, the deceleration and the deceleration time represented by data of the access command signal as an output variable; and correcting the data of the access command signal based on the correction value obtained by the above fuzzy inference calculation.

There is provided an access method of an actuator wherein the actuator is accessed by an access command signal including data of an acceleration, an acceleration time, a deceleration and a deceleration time of the actuator in order to drive the actuator from a starting position thereof for a target moving distance, comprising the step of:

obtaining with trial and error the acceleration, the acceleration time, the deceleration and the deceleration time of the access command signal adapted to the target moving distance over a whole range covering where the actuator can move while each starting position is defined as a parameter.

An access control apparatus according to the present invention comprises a driving means for driving the actuator;

a position detection means for detecting a position of the actuator;

a fuzzy inference calculation means for performing a fuzzy inference calculation based on plural rules, which receives an access command signal including data of an acceleration, an acceleration time, a deceleration and a deceleration time of the actuator, said plural rule having the acceleration, the acceleration time, the deceleration and the deceleration time represented by the access command signal and a starting position of the actuator as input variables, and having a correction value of at least one of the acceleration, the acceleration time, the deceleration and the deceleration time represented by data of the access command signal as an output variable; and a driving signal generation means which corrects the data of the access command signal based on the correction value obtained by the fuzzy inference calculation means and generates a driving signal including data of an acceleration, an acceleration time, a deceleration and a deceleration time of the actuator in order to move the actuator for a predetermined target moving distance.

Further, an access control apparatus according to the present invention comprises a driving means for driving the actuator;

a position detection means for detecting a position of the actuator;

a fuzzy inference calculation means for performing a fuzzy inference calculation based on plural rules, which receives an access command signal including data of an acceleration, an acceleration time, a deceleration and a deceleration time of the actuator, said plural rule having a starting position of the actuator and a target moving distance of the actuator as input variables, and having a correction value of at least one of the acceleration, the acceleration time, the deceleration and the deceleration time represented by data of the access command signal as an output variable;

a driving signal generation means which corrects the data of the access command signal based on the correction value obtained by the fuzzy inference calculation means and generates a driving signal including data of an acceleration, an acceleration time, a deceleration and a deceleration time of the actuator in order to move the actuator for a predetermined target moving distance.

Furthermore, an access control apparatus according to the present invention comprises a driving means for driving an actuator;

a position detection means for detecting a position of the actuator;

a practical moving distance detection means for detecting a practical moving distance of the actuator based on output from the position detecting means;

an optimum access command signal generation means for obtaining with trial and error an acceleration, an acceleration time, a deceleration, a deceleration time of an access command signal which are suitable for a predetermined starting position and a predetermined target moving distance of the actuator with each starting position being set as a parameter and a whole moving range of the actuator being covered with the set starting positions and target moving distances; and an interpolation calculation means for obtaining an acceleration, an acceleration time, a deceleration and a deceleration time of an access command signal corresponding to a predetermined stating position and a predetermined target moving distance of the actuator with interpolation calculation based on the acceleration, the acceleration time, the deceleration and the deceleration time of the access command signal suitable for the predetermined starting position and the predetermined target moving distance of the actuator obtained by the optimum access command signal generation means.

According to the present invention, the actuator is accessed with trial and error from a predetermined starting position for a predetermined target moving distance by a certain access command signal, and thereby an optimum access command signal is obtained over a whole range in which the actuator can move with each starting position being set as a parameter.

Further, the fuzzy inference calculation is preformed with a starting position and either an access command signal or a predetermined target moving distance of the actuator being input variables of the plural rules of the fuzzy inference calculation, and a correction value of at least one of an acceleration, an acceleration time, a deceleration, a deceleration time of the access command signal being an output variable of the plural rules. The actuator is practically accessed by a corrected access command signal corrected on the basis of the correction value. Because an unevenness of force of the actuator is taken into consideration by using the corrected access command signal, a precise access of the actuator is easily and quickly obtained.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 16 (b) is a graph showing relation between travel velocity and time; and

FIG. 16 (c) is a graph showing relation between a travel distance and time.

DETAILED DESCRIPTION OF THE PREFERRED EMBODIMENTS

Figure 1:
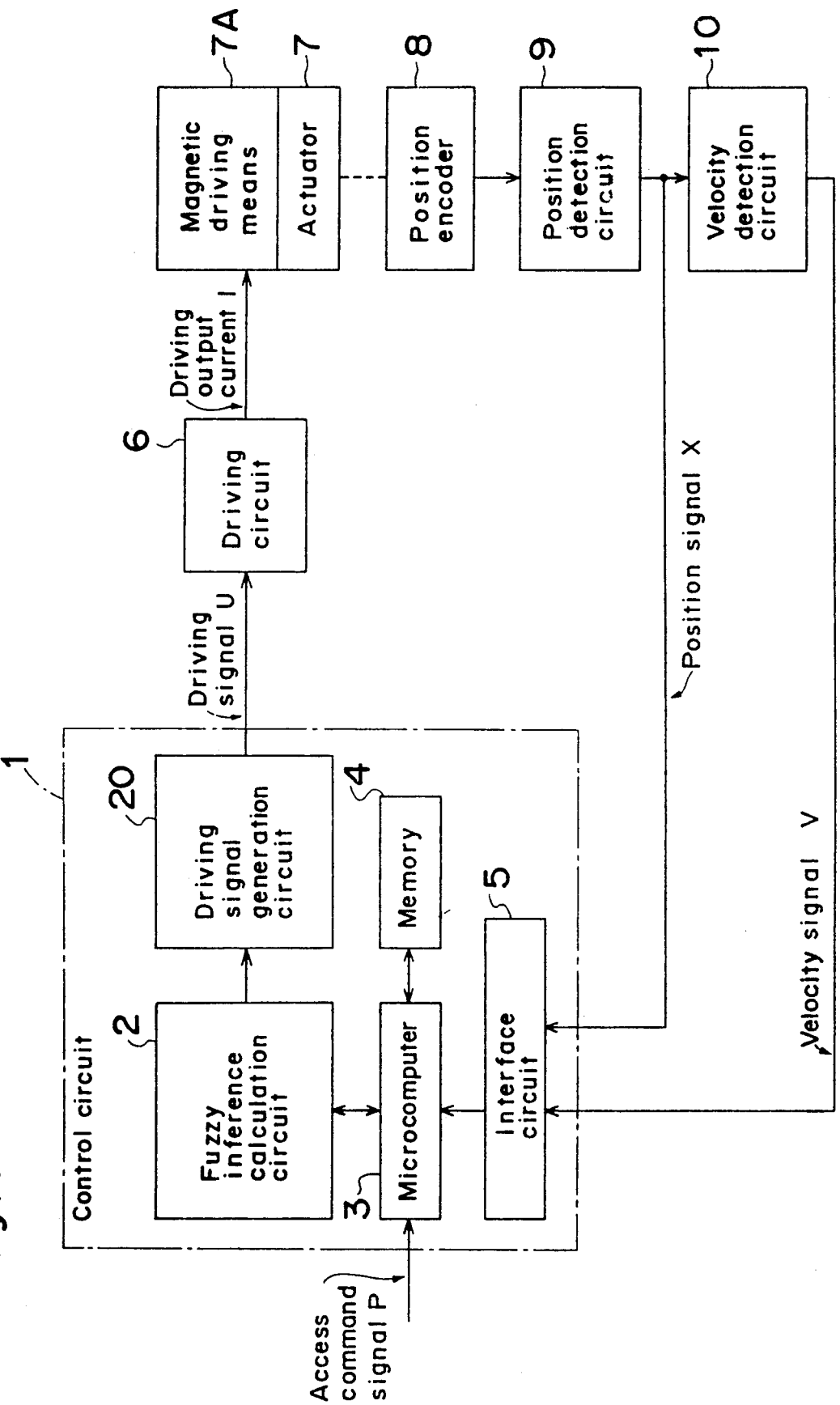
FIG. 1 is a block diagram of a control apparatus for realizing an access method of an actuator of an embodiment according to the present invention.

FIG. 1 is a circuit block diagram of an access control apparatus of an actuator of an embodiment in accordance with the present invention. Referring to FIG. 1, a recording-reproducing transducer (not shown) of an information recording-reproducing apparatus such as an optical disk is mounted on an actuator 7 which is moved by a magnetic driving means 7A. The actuator 7 is moved in compliance with an access command signal P, and the transducer is positioned on a predetermined track of the optical disk, for example.

The position of the actuator 7 is detected by a position encoder 8 and a position detection circuit 9, and a position signal X is output. Moreover, a moving velocity of the actuator 7 is detected by a velocity detection circuit 10 on the basis of the position signal X, and a velocity signal V is output. A control circuit 1 controls the action of the actuator 7 in compliance with an access command signal P which is input from an apparatus such as a computer located outward from the access control apparatus. The control circuit 1 comprises a fuzzy inference calculation circuit 2 which will become apparent from the detailed description given hereinafter, a microcomputer 3, a memory 4, an interface circuit 5 and a driving signal generation circuit 20.

The driving signal generation circuit 20 is an analog switch, for example. The driving signal generation circuit 20 corrects the data of access command signal P based on the correction value obtained by the fuzzy inference calculation circuit 2, and outputs a driving signal U including corrected data of an acceleration, an acceleration time, a deceleration and a deceleration time of the actuator 7 to the driving circuit 6. Accordingly, a driving output current I is supplied to the actuator 7. The driving signal U is a rectangular bipolar signal, for example, and which is similar to the Bang-Bang command signal 100 in the prior art. The actuator 7 is accelerated in the first half of the driving signal U and is decelerated in the latter half thereof. An acceleration and deceleration of the actuator 7 depend on the amplitude of the driving sinal U.

The interface circuit 5 comprises an A/D converter (not shown), and the position signal X and the velocity signal V are converted into digital signals and are applied to the microcomputer 3.

The access command signal P has data of a starting position, a target position and a moving direction of the actuator 7, for example, and is input to the microcomputer 3. The memory 4 is to memorize temporarily various data.

Figure 2:
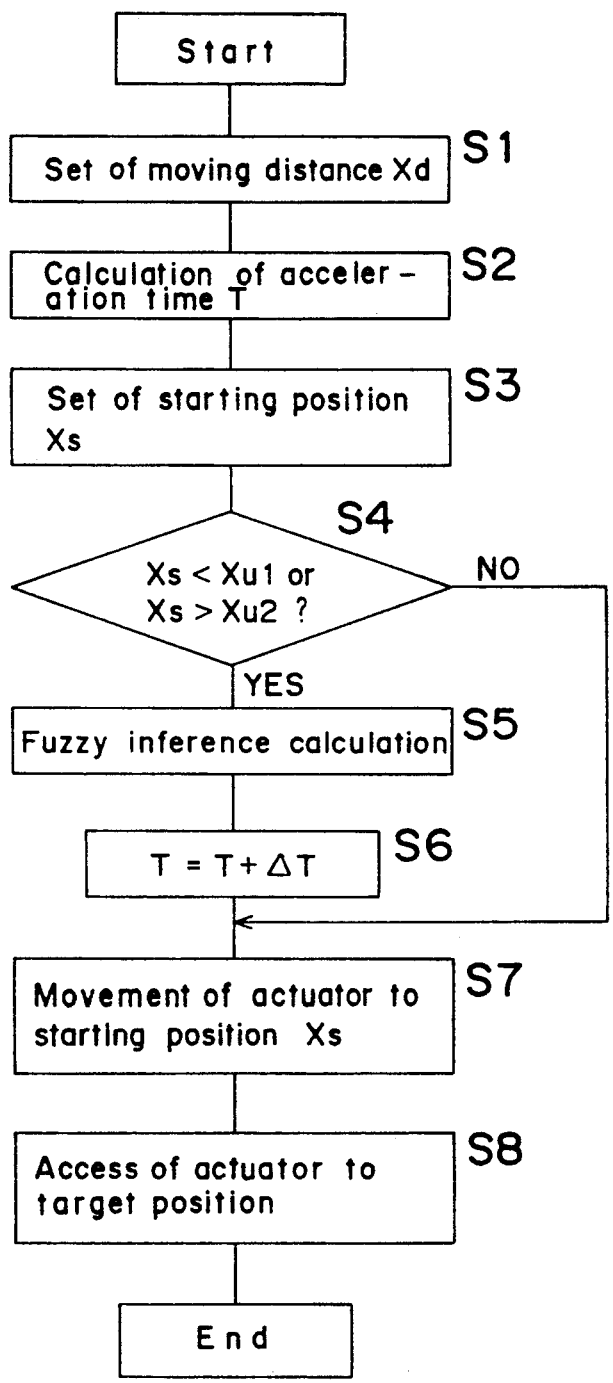
FIG. 2 is a flow chart of the access method of the embodiment.

FIG. 2 is a flow chart of an embodiment of the access method of an actuator in accordance with the present invention. The process shown by the flow chart is performed when accessing the actuator 7 in use.

A moving range of the actuator 7 is determined in accordance with a recording area of an information recording medium and is designated as a maximum moving distance Xmax. A distance between a predetermined starting position of the actuator 7 (one end of the above-mentioned moving range, for example) and a target position appointed by an access command signal is defined as a target moving distance Xd. The range of the target moving distance Xd is given by $$0 \leq Xd \leq Xmax \quad (1)$$

Figure 15:
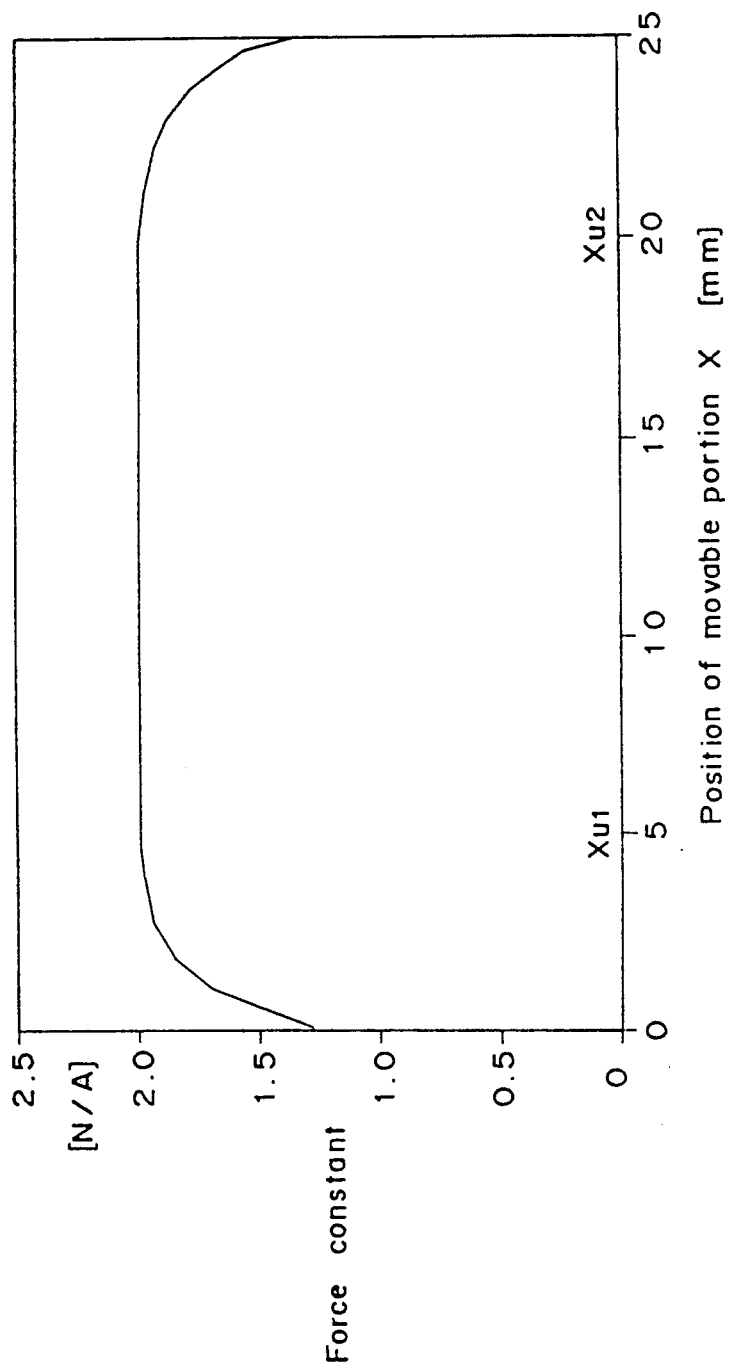
FIG. 15 is a graph representing relation between a position of movable position and a force constant.
Figure 16A:
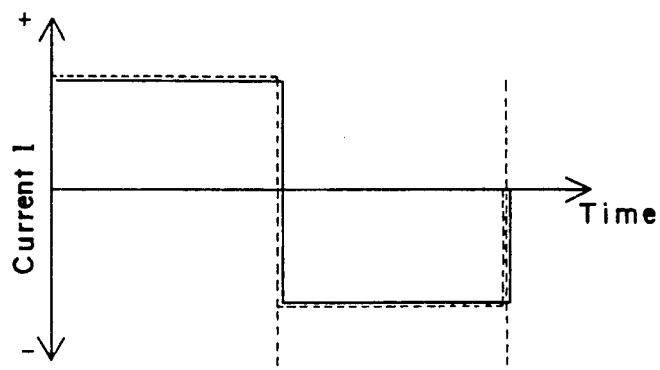
FIG. 16 (a) is a graph representing a current which flows through a magnetic coil.
Figure 16B:
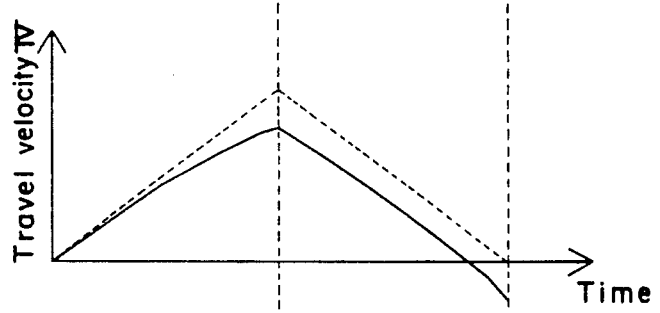
Figure 16C:
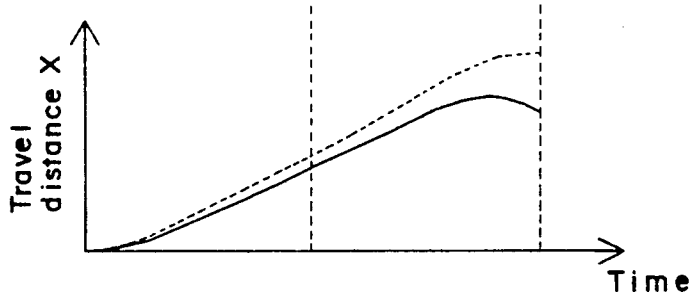

The unevenness of the force for moving the actuator is represented in FIG. 15. The range and degree of the unevenness of the force is predetermined. The range is represented by following expressions (2).

$$Xd \leq Xu1 \text{ or } Xd \geq Xu2 \quad (2)$$

Referring to FIG. 2, first, a target moving distance Xd is preset (step S1 in the flow chart shown in FIG. 2). When the actuator 7 is moved for the distance of the target moving distance Xd, the acceleration time T for which the actuator 7 is accelerated is calculated by the known following equation (3) (step S2).

$$T = (2 \cdot Xd/\alpha)^{\frac{1}{2}} \quad (3)$$

wherein, "α" represents the acceleration of the actuator 7.

Alternatively, the acceleration time T can be obtained as follows. That is, the trial accesses of the actuator 7 are repeated to cause the actuator 7 to travel the target moving distance Xd. Then, a proper acceleration time T which is best adapted to the target moving distance Xd is obtained. The proper acceleration time T is stored in the memory and referred according to demand of it. However, when the relation of the target moving distance Xd and the acceleration time T is obtained by the trial accesses, the trial accesses should be practiced under the condition that the actuator moves only in the range Xd of the following expression (4) where unevenness of the force of the actuator 7 does not occur.

$$Xu1 < Xd < Xu2 \quad (4)$$

The acceleration time T obtained in the step S2 is limited in the case that the actuator moves in the range where the unevenness of the force of the actuator 7 does not occur.

Next, a starting position Xs is preset (step S3), then, it is judged if the starting position Xs is in the range indicated by the equation (4) or not (step S4).

When the starting position Xs is in the range where the unevenness of the force of the actuator 7 does not occur, the actuator 7 is moved to the starting position Xs (step S7), and the actuator 7 accesses according to the acceleration time T (step S8). After termination of the acceleration time T, the actuator 7 is decelerated in the latter half of the driving signal U and stops at a certain position.

On the other hand, when the starting position Xs is in the range where the unevenness of the force of the actuator 7 occurs, the above acceleration time T cannot be used in order to shift the actuator 7 to the target position and to make the velocity of the actuator 7 zero at the target position because the acceleration time T is obtained under the condition that the unevenness of the force of the actuator does not occur. Therefore, it is necessary to choose an optimum acceleration time in other way in order to shift the actuator 7 to the target position. For that purpose, a corrected time ΔT for the acceleration time T is calculated based on the fuzzy inference calculation as described later (step S5). Then, a proper acceleration time T is calculated by using the following equation (5) in the driving signal generation circuit 20 (step S6), and the access is practiced the proper acceleration time T.

$$T = T + \Delta T \quad (5)$$

Through the steps 5 and 6, the influence of the dispersion of the force of the actuator 7 to the acceleration time and deceleration time of the actuator is taken in consideration.

The detailed explanation of the fuzzy inference calculation of step 5 in FIG. 2 is described hereinbelow. Basic inference rules are shown as follows:
Rule 1: If Xs=I and Xd=S, then ΔT=S.
Rule 2: If Xs=I and Xd=M, then ΔT=M.
Rule 3: If Xs=I and Xd=B, then ΔT=B.
Rule 4: If Xs=C and Xd=S, then ΔT=ZR
Rule 5: If Xs=O and Xd=M, then ΔT=M.
Rule 6: If Xs=O and Xd=B, then ΔT=B.
Where, Xs: starting position
Xd: target moving distance
ΔT: correction time
I: inner area
C: center area
O: outer area
S: small
M: medium
B: big
ZR: zero In the above-mentioned inference rules, the inner area is the side where the coordinate X of the point is decided to be zero inside the moving range of the moving portion of the actuator 7. The outer area is the reversed side of the above. The center is the range between the inner area and outer areas.

In the above-mentioned inference rules, representation "if Xs=I and Xd=S" is called a "situation part," and representation "then ΔT=S" is called an "action part." Moreover, representations "I", "C", "O", "S", "M", "B" and "ZR" are called "fuzzy variables."

The fuzzy inference calculation is elucidated as to the rule 1, for example. When a starting position is in the inner area and its target moving distance Xd is a small value, the correction time ΔT is a small value as shown in the Rule 1. In a similar manner, the above-mentioned fuzzy inference calculation is applied to the Rules 2 to 6.

Figure 3C:
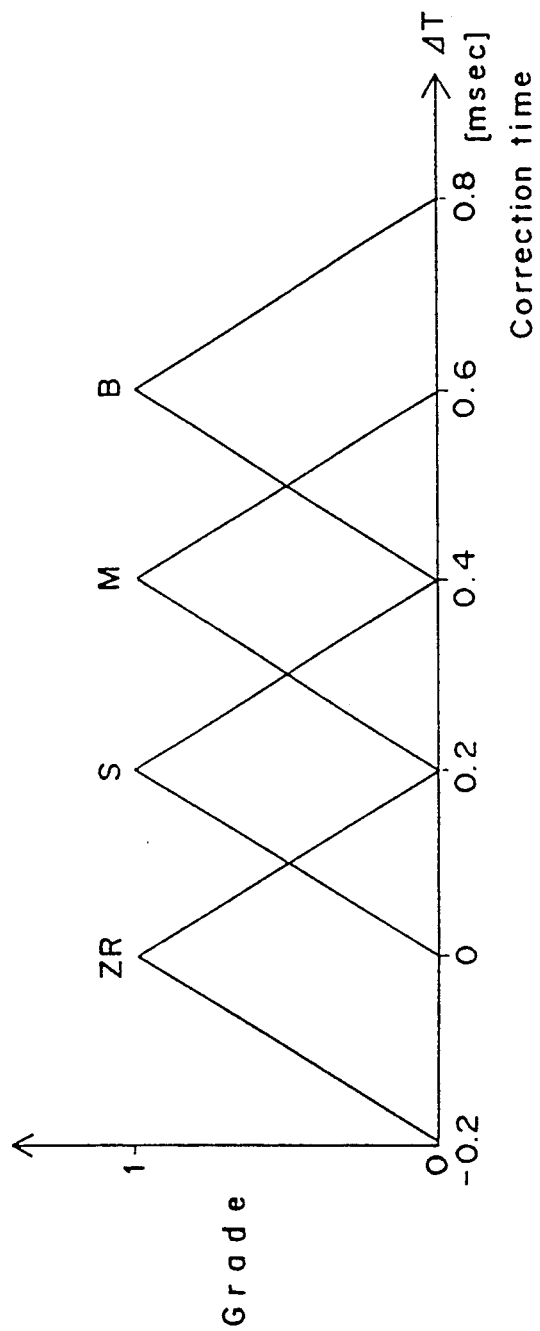
FIGS. 3 (a), (b) and (c) are diagrams representing examples of membership functions of the embodiment.

FIGS. 3 (a), 3(b) and 3(c) are diagrams of membership functions with respect to the above-mentioned fuzzy variables. In FIG. 3(a), an abscissa is graduated by a starting position Xs, and an ordinate is graduated by a grade in the range from 0 to 1. In FIG. 3(b), an abscissa is graduated by a target moving distance Xd, and an ordinate is also graduated by a grade. Also, in to FIG. 3(c), an abscissa is graduated by a correction time ΔT in the range from −0.2 msec to +0.8 msec, and an ordinate is graduated by a grade. In the present embodiment, the maximum moving distance Xmax is 25 mm, and membership functions are represented by triangles.

FIGS. 4(a-1) through 4(f) are diagrams showing a process of the fuzzy inference calculation in the embodiment. In these figures, a starting position Xs is 2.5 mm and a target moving distance Xd is 5 mm. This fuzzy inference calculation is called as the Mamdani method or MIN-MAX composition method presently known in the art.

In FIG. 4(a-1) and 4(a-2) represent the situation parts in Rule 1, and FIG. 4(a-3) represents the action part of the same rule. Because the starting position Xs is 2.5 mm, the grade is 0.5 with respect to the fuzzy variable I. Also, because the target moving distance Xd is 5 mm, the grade is 0.5 with respect to the fuzzy variable S. According to the "and" calculation of the both grades, a smaller grade is chosen. Here, however, the both grades have the same value, and thus, the degree of the situation part becomes 0.5. Consequently, in the action part, the triangle of the membership function is split by the line at the grade 0.5, and the fuzzy variable M of the correction time $\Delta T$ is represented by a trapezoid Z1.

FIGS. 4(b-1) and 4(b-2) represent the situation part in Rule 2 respectively, and FIGS. 4(b-3) represents the action part of the same rule. Here, the grade is 0.5 with respect to the fuzzy variable I, and the grade becomes 0.5 with respect to the fuzzy variable M. Thus, the grade in the situation part is 0.5. Consequently, in the action part, the triangle of the membership function is cut along the line at the grade 0.5, and the fuzzy variable M of the correction time $\Delta T$ is represented by a trapezoid Z2.

FIGS. 4(c-1) and 4(c-2) represent the situation part in Rule 3, and FIG. 4(c-3) represents the action part of the same rule. Here, the grade is 0.5 with respect to the fuzzy variable I, and the grade is 0 with respect to the fuzzy variable B. Thus, the grade is 0 in the situation part. Consequently, the degree in the action part is zero with respect to the fuzzy variable B, and the rule 3 can not be applied to this case.

FIGS. 4(d-1) and 4(d-2) represent the situation part in Rule 4, and FIG. 4(d-3) represents the action part of the same rule. Here, the grade is 0.5 with respect to the fuzzy variable C, and the grade is 0.5 with respect to the fuzzy variable S. Thus, the grade in the situation part is 0.5. Consequently, in the action part, the triangle of the membership function is cut along by the line of the grade 0.5, and the fuzzy variable ZR of the correction time $\Delta T$ is represented by a trapezoid Z3.

FIGS. 4(e-1) and 4(e-2) represent the situation part in Rule 5, and FIG. 4(e-3) represents the action part of the same rule. Here, the grade is 0 with respect to the fuzzy variable O, and the grade is 0.5 with respect to the fuzzy variable M. Thus, the grade in the situation part is 0. Consequently, the degree in the action part is zero with respect to the fuzzy variable M, and the rule 5 can not be applied to the case. Similarly, the rule 6 can not be applied to the situation.

Figure 4F:
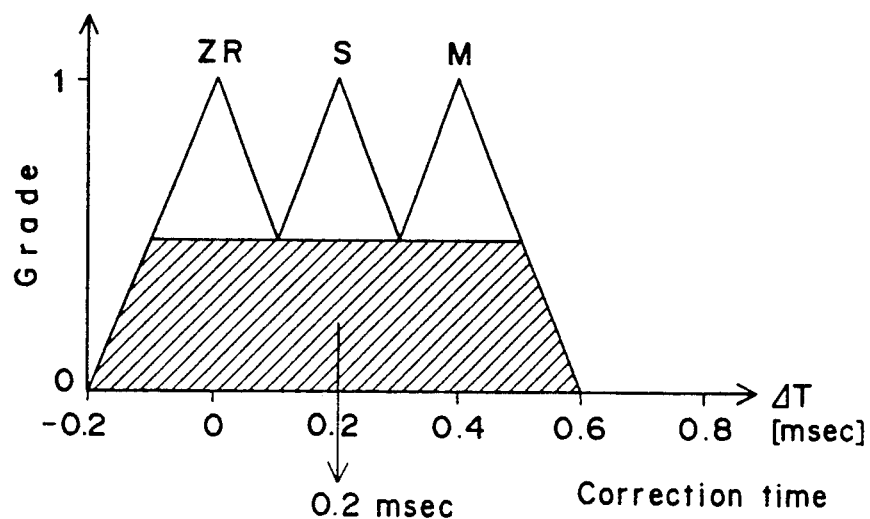
FIGS. 4 (a-1), (a-2), (a-3), (b-1), (b-2), (b-3), (c-1), (c-2), (c-3), (d-1), (d-2), (d-3), (e-1), (e-2), (e-3), and (f) are diagrams representing the calculation process of fuzzy inference.

Referring to FIG. 4(f), a hatched part represents the membership functions in the action parts on which the results of the fuzzy inference calculation with respect to the entire rules from Rule 1 to Rule 6 are represented by means of the MIN-MAX composition method. Then, in order to defuzzify the results, the center of gravity of the hatched part is determined. In the example shown in FIG. 4(f), 0.2 msec of correction time $\Delta t$ is obtained from the center of gravity.

The correction time $\Delta T$ (0.2 msec in this case) is added to the acceleration time T (T=T+$\Delta T$), and a new corrected acceleration time T is calculated (see step S6 in FIG. 2).

In the above embodiment, a target moving distance Xa is used as a fuzzy variable in the situation part. However, an acceleration time T is usable in place of the target moving distance Xd. An example of such a rule is shown below.

If Xs=I and T=S then $\Delta T$=S.

Figure 5:
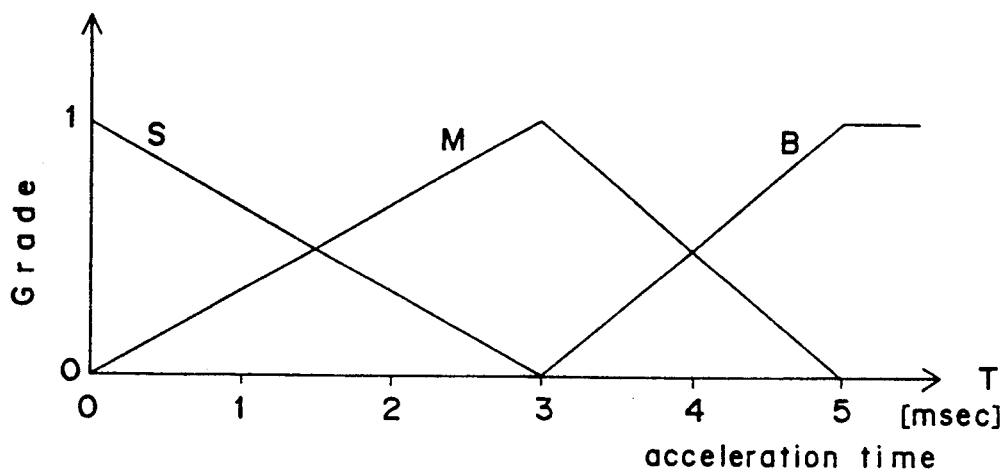
FIGS. 5 and 6 are diagrams representing membership functions according to other embodiment of the present invention.

FIG. 5 is a diagram of membership functions wherein grades of fuzzy variable S, M and B are determined with respect to acceleration Time T. In FIG. 5, an abscissa is graduated by the acceleration time T of the range from 0 msec to 5 msec, and an ordinate is graduated by a grade. The process of the fuzzy inference calculation with respect to the above rule is similar to that mentioned in FIG. 4(a-1)-(f).

In the embodiment, the driving signal U is a rectangular bipolar signal, and the amplitude of the driving signal U which is applied to the actuator 7 in the acceleration step is identical with that in the deceleration step, but these amplitudes can be selected arbitrarily. In such case, a correction amplitude $\Delta D$ for an acceleration step or a deceleration step is usable for the fuzzy variable of the action part of a fuzzy inference calculation. An example of such a rule having a correction amplitude $\Delta D$ in action part is shown as follows.

If Xd=S and $\Delta$Xd=PM, then $\Delta D$=PB.

Figure 6:
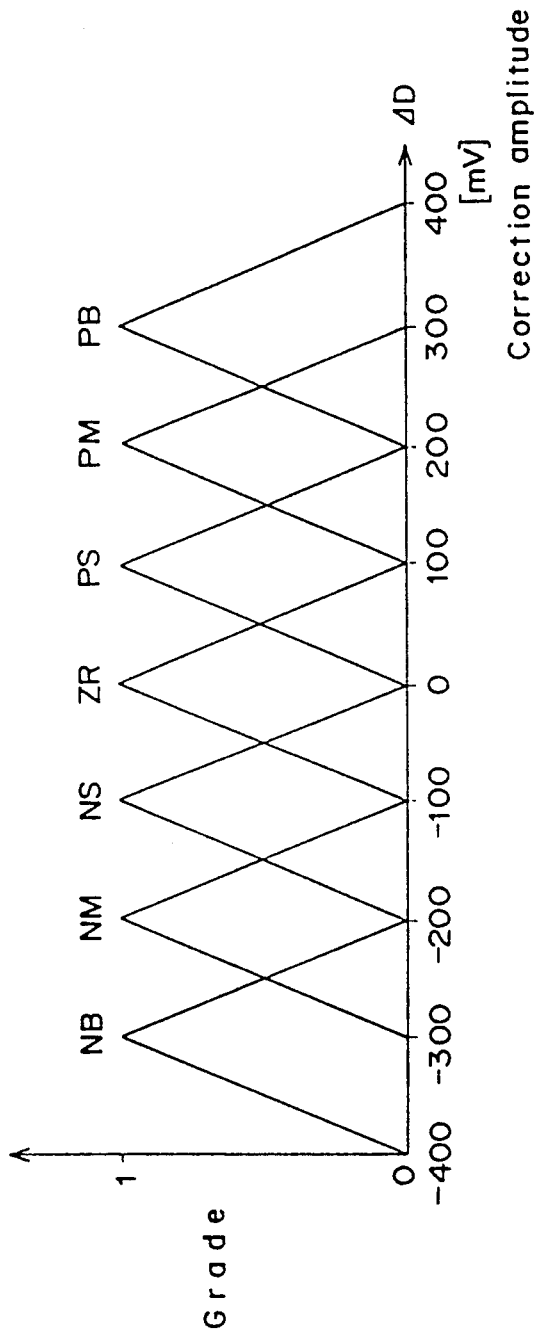

FIG. 6 is a membership function diagram of the fuzzy variable of the correction amplitude $\Delta D$. In FIG. 6, an abscissa is graduated by the correction amplitude $\Delta D$ in the range from −400 mV to +400 mV. An ordinate is graduated by a grade. The steps of the fuzzy inference calculation with respect to the rule are the same as mentioned in FIG. 4.

Moreover, in the embodiment, a correction time which corrects a deceleration time is usable as replacement for the correction time $\Delta t$ of the acceleration time T for the variable in the action part. Furthermore, a pause in moving operation of the actuator 7 can be interposed between the acceleration step and deceleration step. It should be noted that, the contents in the rules and the figures which represent membership function in FIGS. 3, 5 and 6 may vary in accordance with the range or the size of the dispersion of force, or characteristics of the actuator.

In the present embodiment, the unevenness of force of the actuator is caused at the ends of the movable range of the actuator, but the present invention is not so limited in the case. When the unevenness of force of an actuator occurs near the center of the movable range thereof, it is corrected by adjusting the aforementioned rules and the forms of the membership functions.

Figure 7:
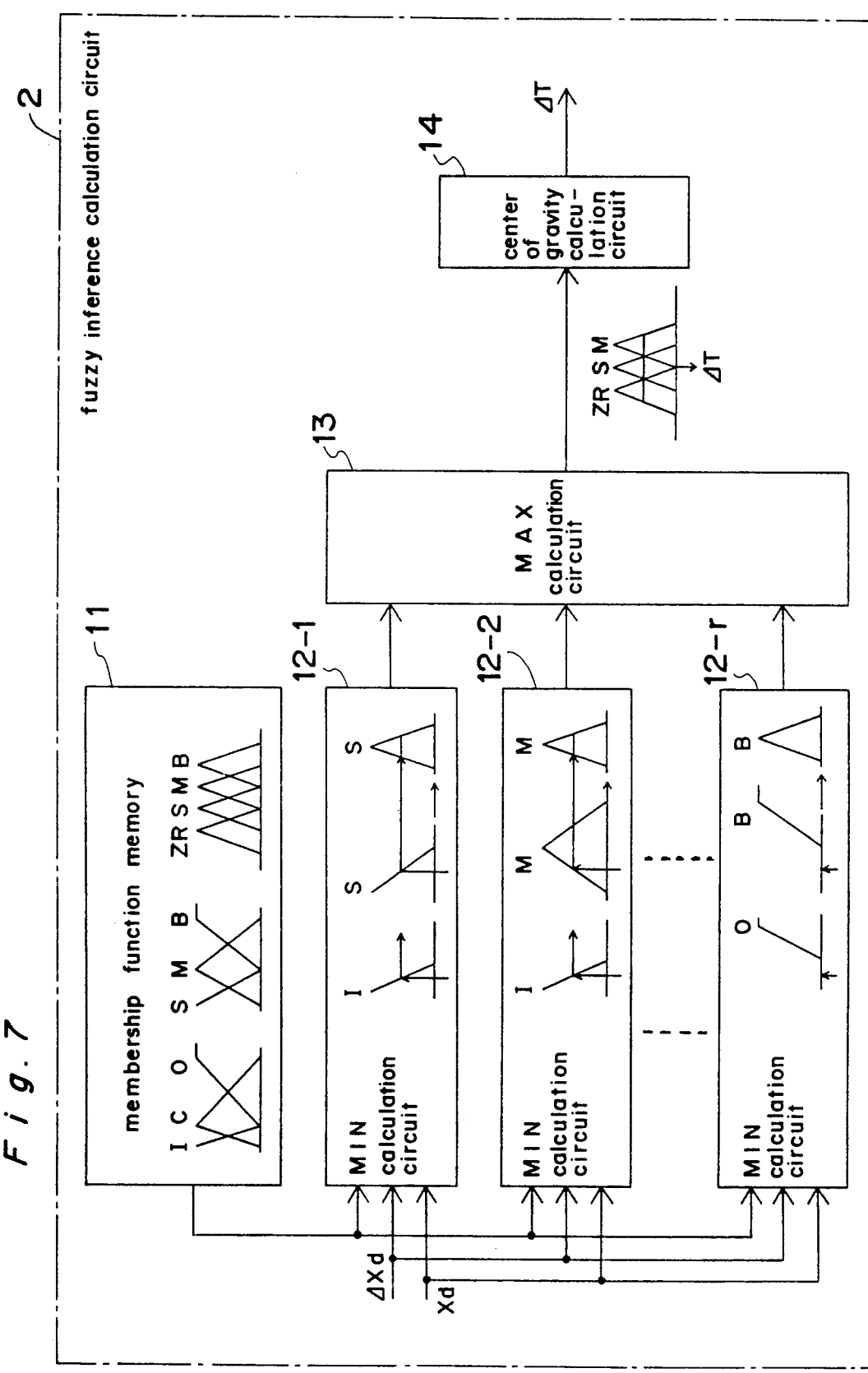
FIG. 7 is a block diagram showing the detailed structure of a fuzzy inference calculation circuit in the embodiment.

FIG. 7 shows the structure of the fuzzy inference calculation circuit 2 of the present embodiment which carries out the calculation by MIN-MAX composition method. Referring FIG. 7, a membership function memory 11 memorizes the membership functions which are predetermined. A MIN calculation circuits 12-i (i=1, 2, ..., n) includes memories for memorizing rules of the fuzzy inference. The number of "n" is equal to those of the rules. In the MIN calculation circuits 12-i, the calculations of the situation part and action part of each rules are executed. All of the outputs from the MIN calculation circuits 12-i (i=1, 2, ..., n) are input into the MAX calculation circuits 13. In the MAX calculation circuit 13, an intersection of sets of the data from the MIN calculation circuits 12-i is obtained and the results thereof is input to a center of gravity calculation circuit 14. In the center of gravity calculation circuit 14, the center of the gravity of the intersection of sets is calculated.

It should be noted that the detailed structure of the fuzzy inference calculation means 2 of the present invention is not so limited as mentioned in the above.

In the case of the above-mentioned access method and the access control apparatus of the actuator, it is necessary to obtain the range and size of the unevenness of the actuator. They are obtained as follows.

Figure 8:
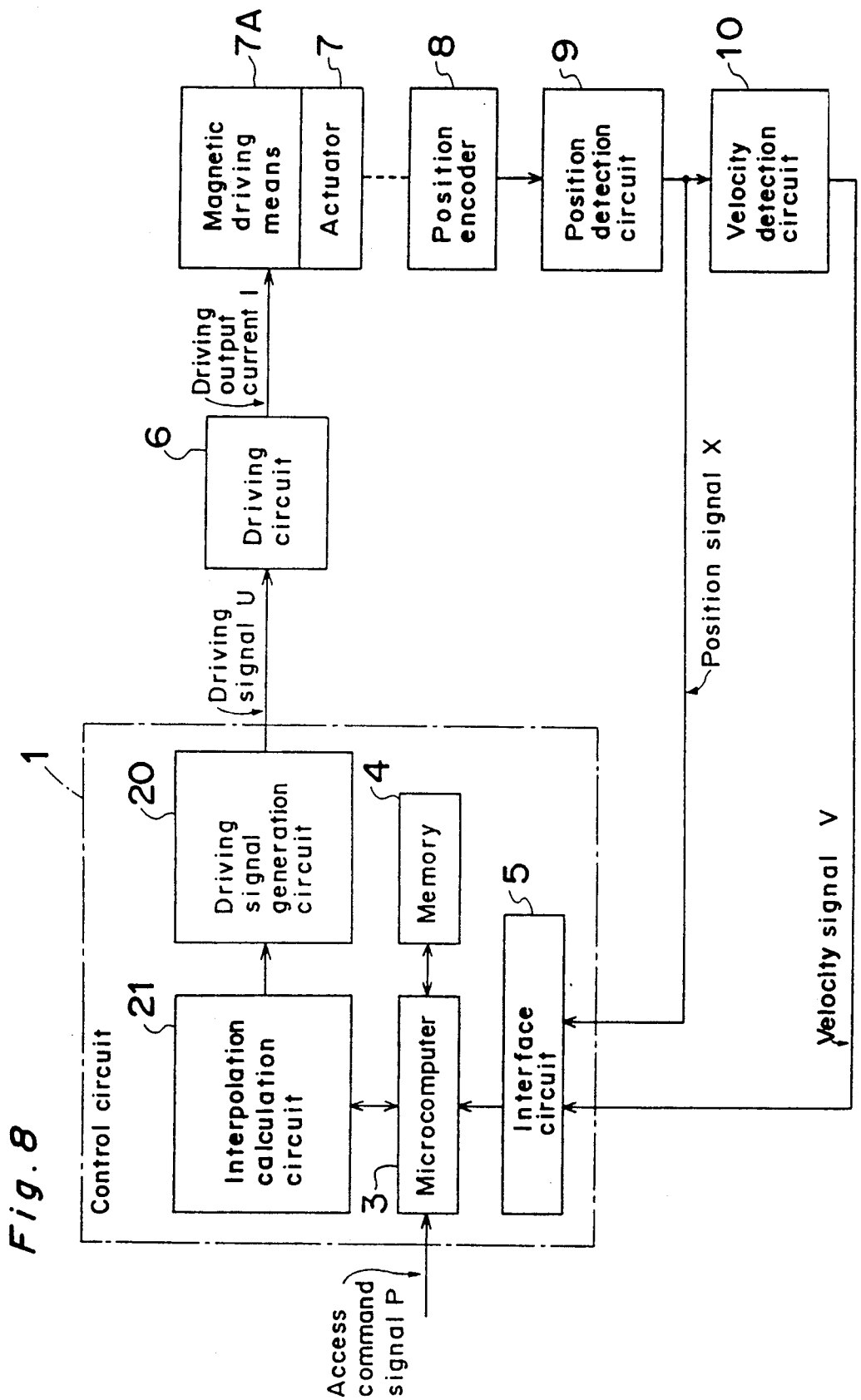
FIG. 8 is a block diagram of an access control apparatus for realizing an access method of an actuator of an embodiment according to the present invention.

FIG. 8 is a block diagram of an access control apparatus of an actuator of an embodiment according to the present invention. FIG. 8 shows the same structure as that of FIG. 1 except for a interpolation calculation circuit 21. A recording-reproducing transducer (not shown) of an information recording-reproducing apparatus such as an optical disk apparatus, etc. is mounted on an actuator 7 which is moved by a magnetic driving means 7A. The actuator 7 is moved in response to an access command signal P, and the transducer is positioned on a predetermined track of an optical disk, for example.

The position of the actuator 7 is detected by a position encoder 8 and a position detection circuit 9, and a position signal X is output. Moreover, a velocity of the actuator 7 is detected by a velocity detection circuit 10 on the basis of a position signal X, and a velocity signal V is output. A control circuit 1 controls the action of the actuator 7 in accordance with an access command signal P which is input from an apparatus such as a computer located outward from the access control apparatus. The control circuit 1 comprises a interpolation calculation 21 which will become apparent from the detailed description given hereinafter, a microcomputer 3, a memory 4, an interface circuit 5 and a driving signal generation circuit 20.

The driving signal generation circuit 20 is an analog switch, for example, and receives an access command signal P from the interpolation calculation circuit 21, and outputs a driving signal U including data of an acceleration, an acceleration time, a deceleration and a deceleration time of the actuator 7 to the driving circuit 6. Accordingly, a driving output current I is supplied to the actuator 7. The driving signal U is a rectangular bipolar signal, for example, and which is similar to the Bang-Bang command signal 100 in the prior art. The actuator 7 is accelerated in the first half of the driving signal U and is decelerated in the latter half thereof. An acceleration and deceleration of the actuator 7 depend on the amplitude of the driving sinal U.

The interface circuit 5 comprises an A/D converter (not shown), and the position signal X and velocity signal V are converted into digital signals and are applied to the microcomputer 3.

The access command signal P has data of a starting position, a target position and a moving direction of the actuator 7, for example, and is input to the microcomputer 3. The memory 4 is to memorize temporarily various data.

Figure 9:
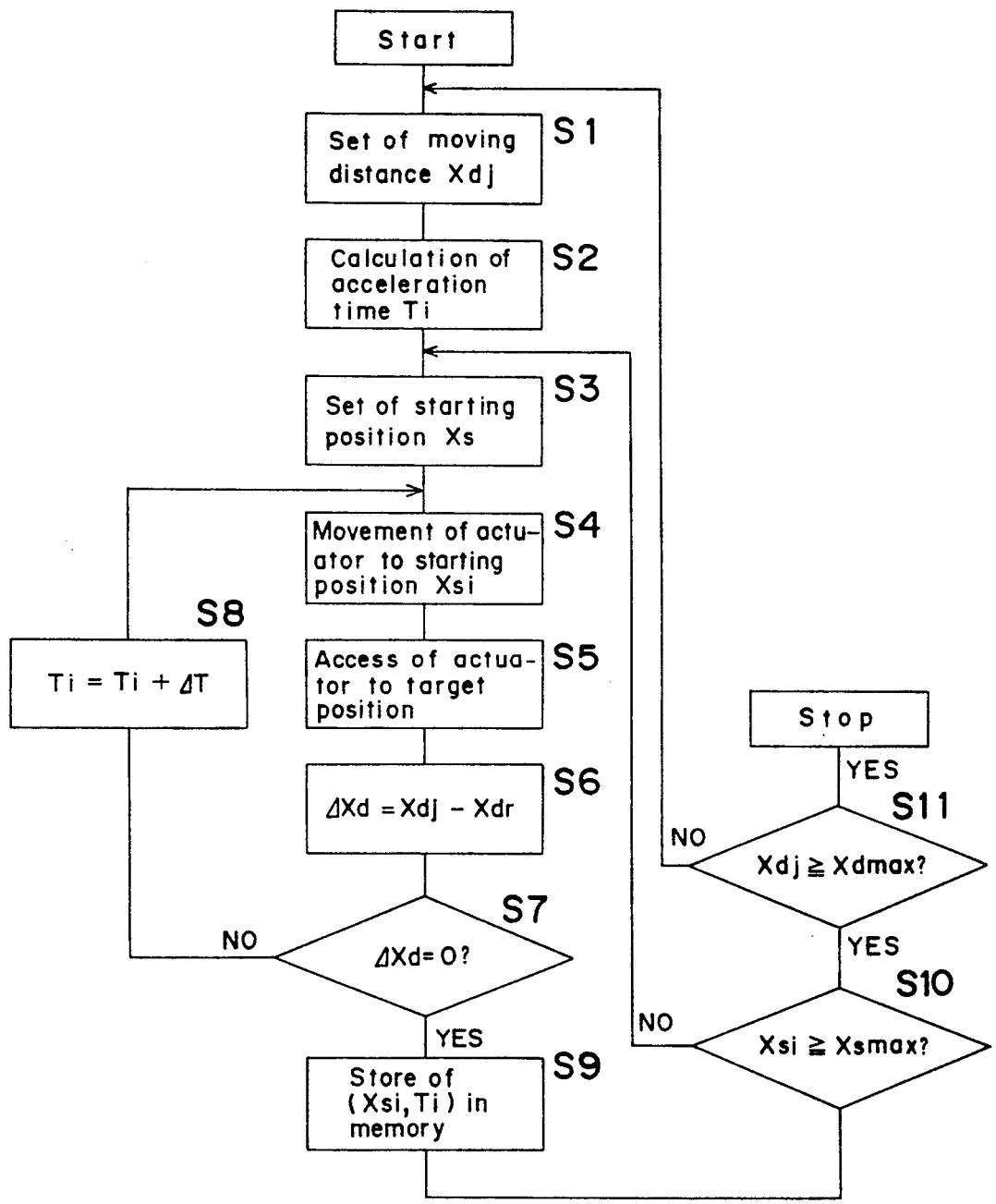
FIG. 9 is a flow chart representing an access method of an actuator of the embodiment according to the present invention.

FIG. 9 is a flow chart of an embodiment of an access method of an actuator in accordance with the present invention. The process shown by the flow chart is performed in a factory prior to delivery of the access control apparatus to a customer location or at a customer before using it immediately after the supply of power.

Referring to FIG. 9, first, a distance that the actuator 7 should move, or a target moving distance Xdj is set (step 1 in FIG. 9).

When the actuator 7 is moved for the target moving distance Xdj, the acceleration time T for which the actuator 7 is accelerated is calculated by the known following equation (6).

$$T = (2 \cdot Xd/a)^{\frac{1}{2}} \qquad (6)$$

where, "a" represents the acceleration of the actuator 7. The acceleration time T calculated by the equation (6) is the theoretical value, and the influence due to the dispersion of the force of the actuator is not considered. After the termination of the acceleration time Ti, the actuator 7 is decelerated in the latter half of the driving signal U and stops at a certain position. If the acceleration time Ti is not appropriate, the actuator 7 does not stop at the target position, or the moving velocity does not becomes zero at it. Therefore it is necessary to select an optimum acceleration time to make the actuator move to the target position. Thus, as shown in FIG. 9, the optimum acceleration time is obtained by the trial operation of the actuator on the basis of the acceleration time Ti calculated by the equation (6).

First, a starting position Xsi is provided (step S3), and the actuator 7 is shifted to the starting position Xsi (step S4).

Next, the actuator 7 is accelerated for the acceleration time Ti, and then is decelerated to move for the moving distance Xd until the moving velocity becomes zero (step S5). As a result, the actuator 7 stops at a certain position. A shift distance Xdr which is defined as a practical moving distance between the starting position and the position where the moving velocity of the actuator becomes zero are measured. Then, a distance deviation $\Delta Xd$ between the target moving distance Xdj and the shift distance Xdr is calculated by the following equation (7) (step S6).

$$\Delta Xd = Xdj - Xdr \qquad (7)$$

When the distance deviation $\Delta Xd$ is sufficiently small, that is, smaller than a preset value (step S7), the acceleration time Ti and the starting position Xsi is stored in the memory 4 (step S9).

On the other hand, when the distance variation $\Delta Xd$ is not so small, a certain correction time $\Delta T$ for the acceleration time Ti is set, and is added to the acceleration time Ti. In other words, a corrected acceleration time Ti is calculated by the following equation (8) (step S8).

$$Ti = Ti + \Delta T \qquad (8)$$

Subsequently, the actuator 7 is returned to the starting position Xsi, and the actuator 7 is moved again for the corrected acceleration time Ti. The above-mentioned steps 4, 5, 6, 7 and 8 are repeated until the distance deviation $\Delta Xd$ becomes substantially zero. When the distance deviation $\Delta Xd$ is substantially zero, the data (Xsi, Ti) including the starting position Xsi and the acceleration time Ti is stored in the memory 4 (step S9).

In addition, a new starting position Xs(i+1) is calculated by the following equation (9) where a preset position correction value $\Delta Xs$ is added to the starting position $Xsi$ (step S3).

$$Xs(i+1) = Xsi + \Delta Xs \qquad (9)$$

The processes of steps 1 to 9 are repeated (m) times until a newest starting position $Xsi$ becomes the maximum starting position $Xsmax$. Thus, data $(Xsi, Ti)$ $(i=0, 1, 2, \ldots, m)$ which represent a starting position and an acceleration time are obtained with respect to all of starting points $Xsi$ $(i=0, 1, 2, \ldots, m)$. These $(M+1)$ pieces of data $(Xsi, Ti)$ are stored in the memory 4.

When a new starting position $Xsi$ becomes the maximum starting position $Xsmax$ or bigger than the maximum starting position $Xsmax$, a new target distance $Xd(j+1)$ is obtained by adding a certain correction value $\Delta Xdd$ to the target moving distance $Xdj$ according to the equation (10) (step 10, step 1).

$$Xd(j+1) = Xdj + \Delta Xdd \qquad (10)$$

The above-mentioned processes of steps 1 to 10 are applied to all target moving distance $Xd0, Xd1, Xd2, \ldots, Xdj, \ldots, Xdk$ (step S11), and $(m+1)$ pieces of data $(Xsi, Ti)$ $(i=0, 1, 2, \ldots, m)$ are obtained and stored in the memory 4 similarly to the above. The above-mentioned steps 1 to 10 constitutes an optimum access command signal generation means.

When driving forces of the actuator are not the same in both moving directions, the above processes should be executed with respect to the both moving directions.

Figure 10:
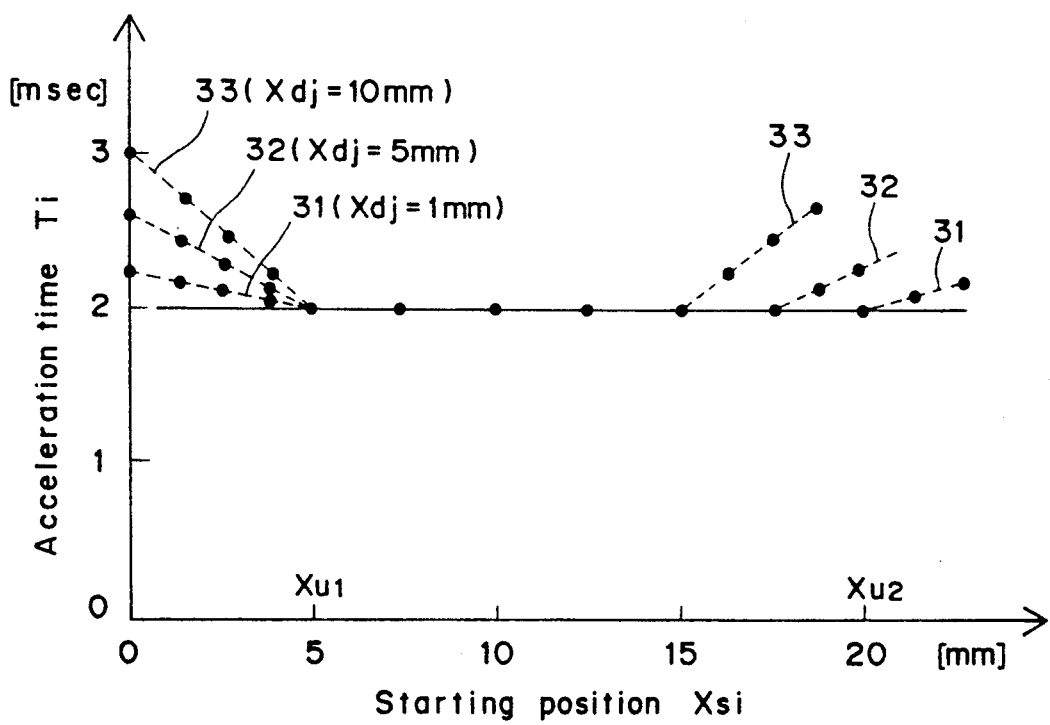
FIG. 10 is a graph indicating a relation between starting positions and acceleration times of the actuator in the embodiment wherein travel distances are represented as parameters.

FIG. 10 represents the relation between a starting position $Xsi$ and acceleration time $Ti$ obtained by the process as mentioned in the above.

In FIG. 10, a straight line which is a solid line represents an acceleration time $Ti$ suitable for each starting position $Xsi$ when the dispersion of the force of the actuator does not happen. On the other hand, dotted lines designate acceleration times $Ti$ respectively adapted to starting position $Xsi$ when unevenness of the force of the actuator occurs. A number 31 represents the case that the length of a target moving distance $Xdj$ is 1 mm, and in the same way, 32 and 33 represent that the target moving distances $Xdj$ are 5 mm and 10 mm respectively.

When the target moving distance $Xdj$ is 1 mm, in the range of $Xs$ where $Xu1 < Xs < Xu2$, $Xu1 = 5$ mm, $Xu2 = 20$ mm, the point $(Xsi, Ti)$ is substantially on the solid line. In the figure, $Xu1$ and $Xu2$ represent a border of the ranges in one of which the dispersion of the force of the actuator happens and in the other of which the dispersion does not happen. Thus, when the target moving distance $Xdj$ is relatively short, the border if the unevenness of the force of the actuator happens or not is inferred based on the relation between the starting position $Xsi$ and the acceleration time $Ti$ obtained by performing the above-mentioned processes.

FIG. 10 indicates that, in the range where the unevenness of the force of the actuator occurs ($Xs < Xu1$ or $Xs > Xu2$), the acceleration time $Ti$ must be set longer than the value on the solid line. Also, as the unevenness of the force of the actuator becomes bigger, the acceleration time $Ti$ must be set longer than the value on the solid line.

As described hereinbefore, by setting a starting position $Xs$ as a parameter and executing the access of the actuator for a predetermined moving distance from each starting position $Xsi$, the acceleration time suitable for the moving distance can be inferred.

In addition, at least one of an acceleration, an acceleration time, a deceleration and a deceleration time of an access command signal given from the outside is replaced with at least one of the acceleration, the acceleration time, the deceleration and the deceleration time of the access command signal obtained with the trial and error.

The relation of a starting position and a acceleration time obtained in the above-mentioned process is discrete as shown in FIG. 10. Thus, the acceleration time $T$ suitable for an arbitrary target moving distance $Xd$ and an arbitrary starting position $Xs$ is obtained by applying the following interpolation operation. This operation is performed just before the apparatus is accessed for practical use.

Figure 11A:
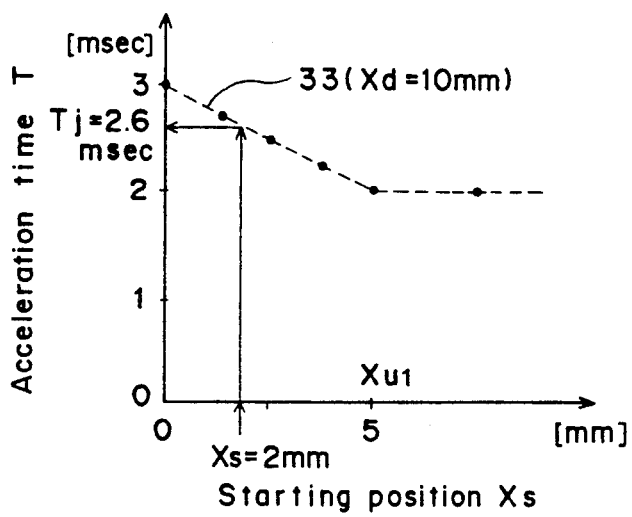
FIGS. 11 (a), (b) and (c) are graphs representing enlarged parts of the graph shown in FIG. 10.
Figure 11B:
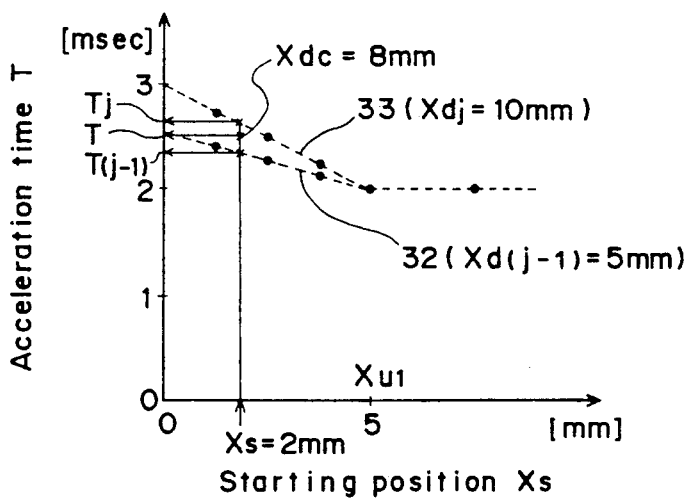

FIGS. 11 (a), (b) and (c) respectively show enlarged parts of the graph shown in FIG. 10. Specifically, FIG. 11 (a) is a graph of enlarged part where a starting position $Xs$ is in the range of $Xs$ where $Xs < Xu1$ when a target moving distance $Xs$ is 10 mm. In this case, the acceleration time $T$ with respect to an arbitrary starting position $Xs$ is obtained by applying the following equation (11).

$$Tj = \frac{[Ti - T(i-1)] \cdot [Xs - Xs(i-1)]}{[Xsi - Xs(i-1)]} + T(i-1) \qquad (11)$$

Therefore, in an example shown in the FIG. 11 (a), by substituting $Xs = 2$ mm, $Xsi = 2.5$ mm, $Xs(i-1)$ 1.25 mm, $Ti = 2.5$ msec, and $T(i-1)$ 2.75 msec for the equation (11), the acceleration time $Tj = 2.6$ mm/msec is obtained.

Next, based on the relation between the starting position $Xsi$ and the acceleration time $Ti$ which is obtained beforehand and shown in FIG. 10, an acceleration time $T$ for an arbitrary target moving distance $Xdc$ can be obtained as follows.

FIG. 11 (b) shows the enlarged part where a starting position $Xs$ is in the range of $Xs$ where $Xs < Xu1$ when target moving distances are 5 mm and 10 mm respectively. It is considered that, in an arbitrary starting position $Xs$ (here, $Xs = 2$ mm), the target moving distance $Xdj$ and the acceleration time $Tj$ are in linear relation, then the acceleration time is interpolated by the following equation (12).

$$T = \frac{[Tj - T(j-1)] \cdot [Xdc - Xd(j-1)]}{[Xdj - Xd(j-1)]} + T(j-1) \qquad (12)$$

In an example shown in FIG. 11 (b), first, both acceleration times $Tj$ in the case that starting position $Xs = 2$ mm, moving distances $Xdj = 10$ mm and $Xd(j-1) = 5$ mm are calculated based on the equation (11), and $Tj = 2.6$ mm, $T(j-1) = 2.3$ mm are obtained. Then, by substituting the obtained $Tj = 2.6$ mm, $T(j-1) = 2.3$ mm and $Xdc = 8$ mm into the equation (12), an acceleration time $T = 2.48$ mm is obtained.

FIG. 11 (c) shows the enlarged part where a starting position $Xs$ is in the range of $Xs$ where $Xs < Xu2$ when the target moving distances $Xd$ are 5 mm and 10 mm. In the figure, straight lines 32 and 33 correspond to preset target moving distances $Xd(i-1)$ and $Xdi$, respectively. A straight line 34 representing a certain target moving distance $Xsc$ is interpolated by the above-mentioned straight lines 32 and 33. Next, the value of a starting position Xsc represented by an intersection A of the line 34 and a straight line of T=2 msec is calculated by the following equation (13).

$$Xsc = \frac{[Xsi - Xs(i-1)] \cdot [Xdc - Xd(i-1)]}{[Xdi - Xd(i-1)]} + Xs(i-1) \quad (13)$$

Figure 11C:
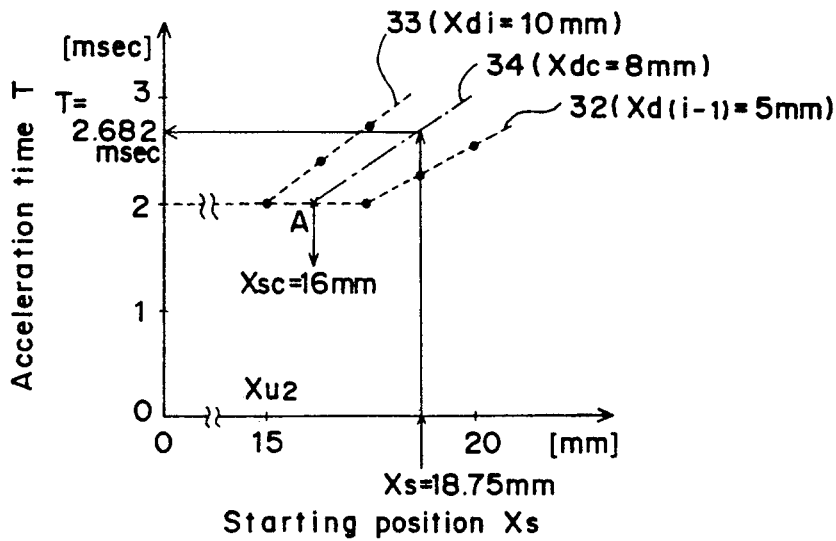

In an example of FIG. 11(c), an interpolated starting position Xsc=16 mm is obtained by substituting the values Xdc=8 mm, Xs(i−1)=17.5 mm, Xsi=15 mm and Xdi=10 mm into the equation (13).

Next, the inclinations K(i−1) and Ki of the straight lines 32 and 33 are interpolated by the equation (14).

$$Kc = \frac{[Ki - K(i-1)] \cdot [Xdc - Xd(i-1)]}{[Xdi - Xd(i-1)]} + K(i-1) \quad (14)$$

In the example in FIG. 11(c), the inclination Kc=0.248 m/sec of the interpolated straight line 34 is obtained by substituting the values Xdc=8 mm, K(i−1)=0.2 sec/m, Ki=0.28 sec/m, Xd(i−1)=5 mm and Xdi=10 mm into the equation (14). In addition, by applying the relation of the interpolated straight line, the acceleration time T for the starting position Xs is obtained based on the following equation (15).

$$T = Kc \cdot [Xs - Xsc] + Tc \quad (15)$$

As to the example in FIG. 11(c), the acceleration time T=2.682 msec is obtained by substituting the values K=0.24 sec/m, Xs=18.75 mm, Xsc=16 mm, and Tc=2 msec into the equation (15).

According to the above-mentioned processes, the acceleration time T for a certain target moving distance Xd and a starting position Xs is obtained by applying the interpolation processes based on discrete values of starting positions Xs and acceleration times Ti.

Figure 12A:
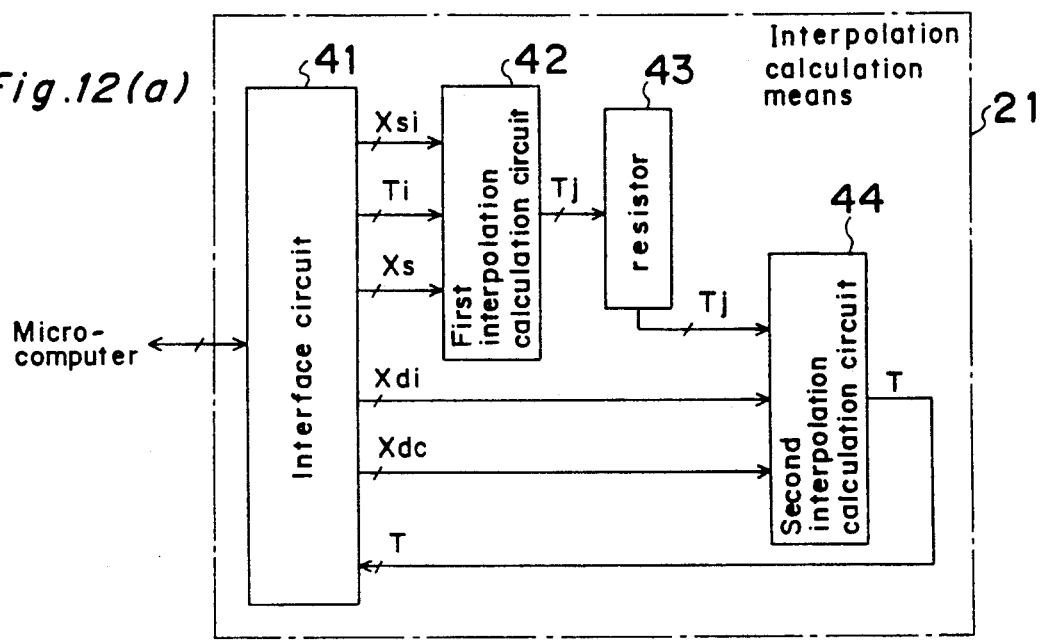
FIGS. 12 (a) and (b) are block diagrams specifically representing interpolation calculation circuits in an embodiment of the present invention.
Figure 12B:
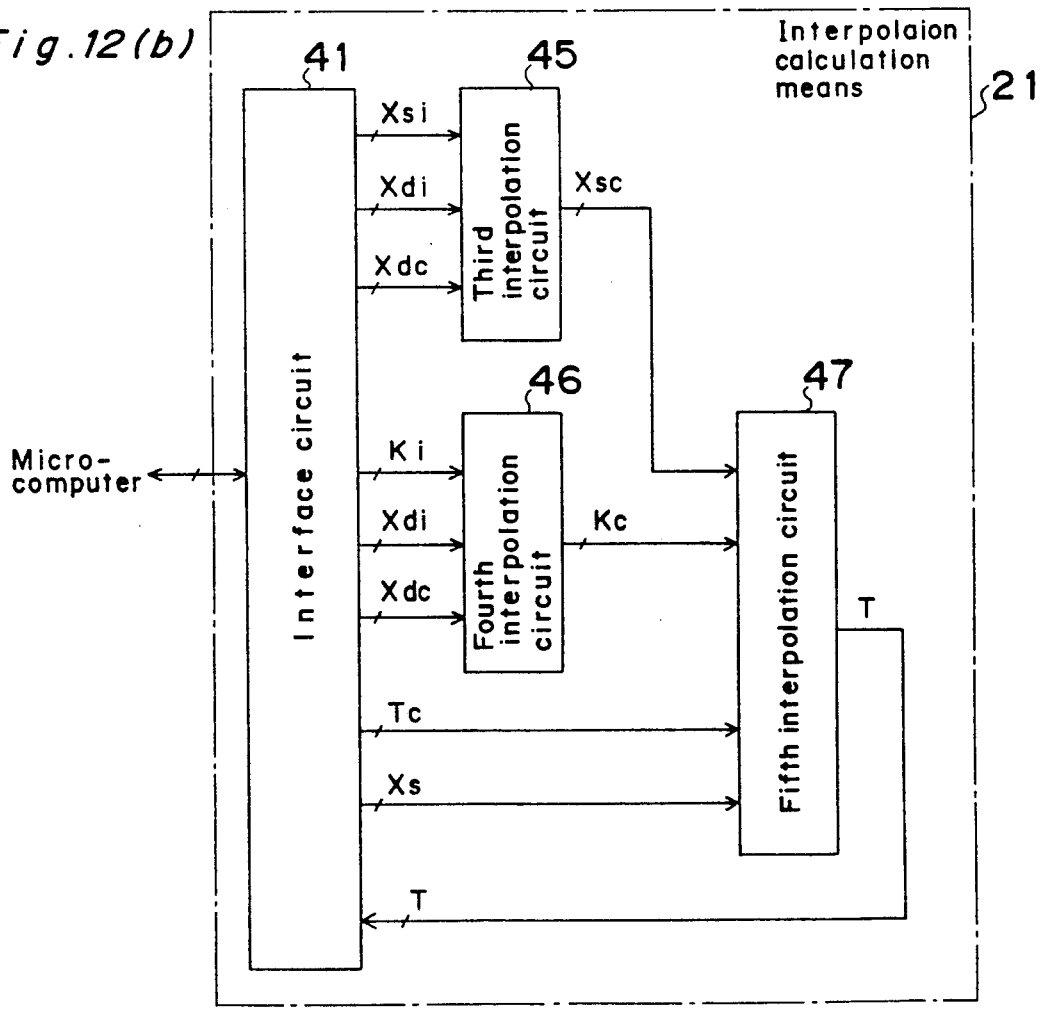
Figure 13:
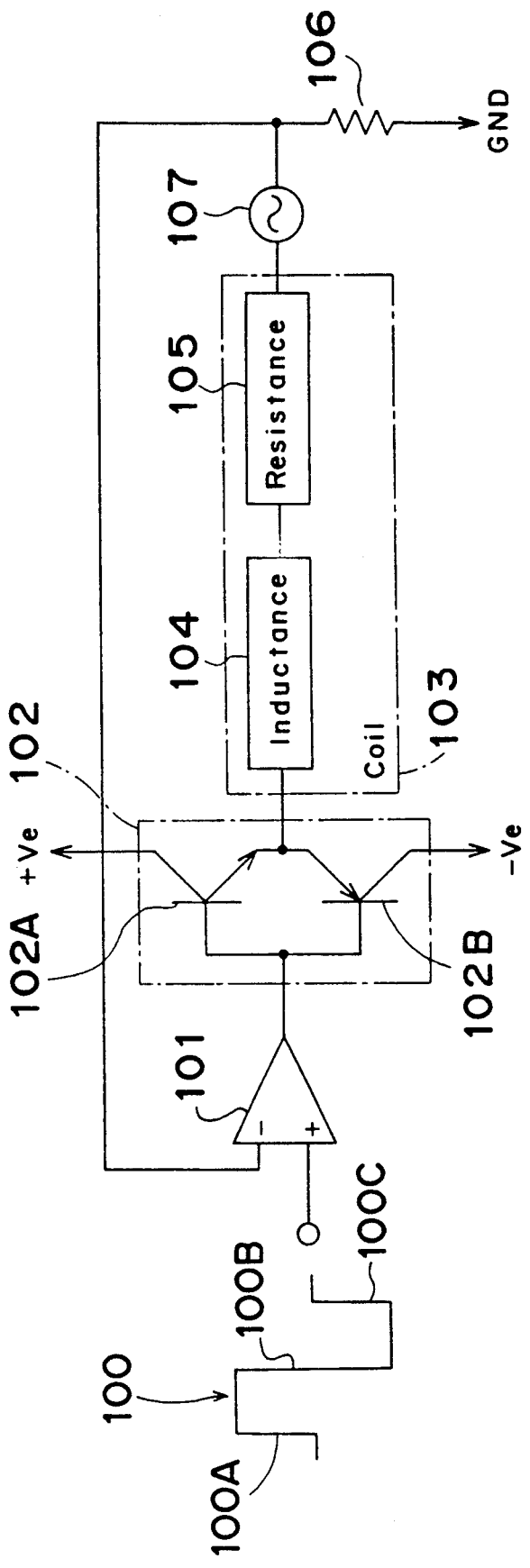
FIG. 13 is a block diagram of an actuator driving circuit of a conventional access control apparatus.
Figure 14:
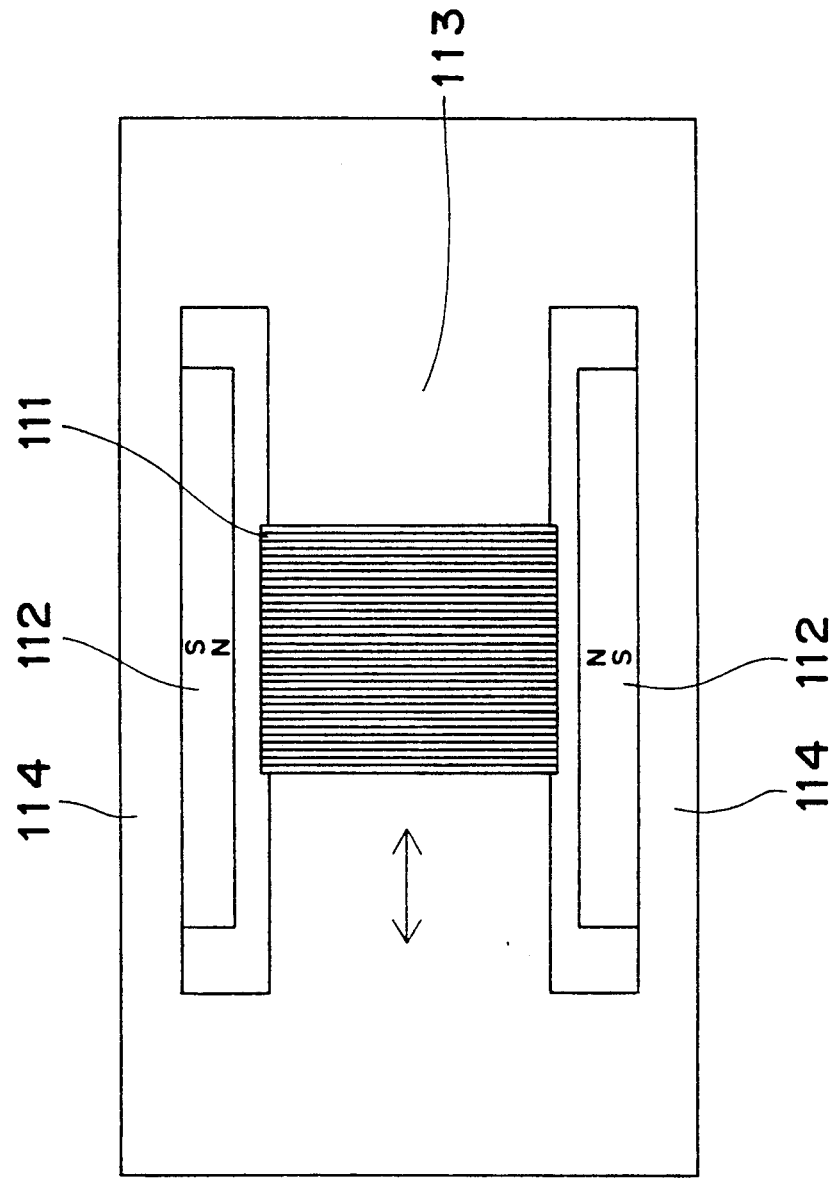
FIG. 14 is a side view of an actuator.

FIGS. 12 (a) and (b) represent the structure of an interpolation calculation means 21 used in this embodiment. The structure shown in FIG. 12 (a) makes it possible to execute interpolation calculations based on the equations (11) and (12). Also, the structure of FIG. 12 (b) makes it possible to execute interpolation calculations based on the equations (13), (14) and (15). The structure and operation of the interpolation calculation means of the FIG. 12 (a) and (b) are explained hereinbelow.

As shown in FIG. 12 (a), the interpolation calculation means 21 is composed of an interface circuit 41, a first interpolation calculation circuit 42, a register 43 and a second interpolation calculation circuit 44. The interface circuit 41 receives digital data from the microcomputer 3, and send them to the first and second interpolation circuit 42 and 44.

The first interpolation calculation circuit 42 performs the interpolation calculation represented by the equation (11), and derives the acceleration time Tj for a certain starting position Xs and a preset target moving distance Xdj from the relation among the preset target moving distance Xdj, a preset starting position Xsi and a preset acceleration time Ti therefor. The register 43 stores more than two calculation data, and send out the data one by one to the second interpolation calculation circuit 44 according to a timing signal (not shown in figures) from the outside.

The second interpolation calculation circuit 44 makes it possible to execute the interpolation calculation represented by the equation (12). Thereby, an acceleration time T adapted to an arbitrary starting position Xd is obtained based on the data T(j−1) and Tj obtained at the first interpolation calculation circuits 42. The obtained data is sent out to the microcomputer 3 through the interface circuit 41.

In FIG. 12 (b), the interpolation calculation means 21 is composed of a interface circuit 41, a third interpolation calculation circuit 45, a fourth interpolation calculation circuit 46 and a fifth interpolation circuit 47. The interface circuit 41 receives digital data from the microcomputer 3, and send them to the third interpolation circuit 45, forth interpolation circuit 46 and fifth interpolation circuit 47.

The third interpolation calculation circuit 45 is provided to make it possible to carry out the interpolation calculation represented by the equation (13). Thereby, the data of starting position Xsc suitable for a certain target moving distance Xdc is obtained based on the basis of the values of starting positions Xs(i−1) and Xsi with respect to target moving distances Xd(i−1) and Xdi which are provided beforehand.

The forth interpolation calculation circuit 46 makes it possible to perform the interpolation calculation represented by the equation (14). Thereby, the data of inclination Kc adapted to a certain target moving distance Xdc is obtained based on the values of inclinations K(i−1) and Kxi respectively corresponding to the target moving distances Xd(i−1) and Xdi which are provided beforehand.

The fifth interpolation calculation circuit 47 make it possible to execute the interpolation calculation represented by the equation (15). Thereby, an acceleration time T is calculated based on the data of the starting position Xsc and inclination Kc, both of which are obtained in the third and fourth interpolation calculation circuits 46 and 47, a certain starting position Xs and a certain acceleration time Tc. The obtained data is sent out to the microcomputer 3 through the interface circuit 41.

In the above embodiment, at least one of an acceleration, an acceleration time, a deceleration and a deceleration time of an access command signal given from the outside is replaced with at least one of the acceleration, the acceleration time, the deceleration and the deceleration time of the access command signal obtained with the interpolation calculation.

Additionally, the first, second, fourth and fifth interpolation calculation circuits 44, 45, 46, and 47 include several adders and multipliers respectively, and are constituted by a known circuit making method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An access method of an actuator wherein the actuator is accessed by an access command signal including data of an acceleration, an acceleration time, a deceleration and a deceleration time of the actuator in order to drive the actuator from a starting position thereof for a predetermined target moving distance, comprising the steps of:

performing a fuzzy inference calculation based on plural rules which have the acceleration, the acceleration time, the deceleration and the deceleration time represented by the access command signal and the starting position of the actuator as input variables, and have a correction value of at least one of the acceleration, the acceleration time, the deceleration and the deceleration time represented by data of the access command signal as an output variable; and correcting the data of the access command signal based on the correction value obtained by the above fuzzy inference calculation.

2. An access method of an actuator wherein the actuator is accessed by an access command signal including data of an acceleration, an acceleration time, a deceleration and a deceleration time of the actuator in order to drive the actuator from a starting position thereof for a predetermined target moving distance, comprising the steps of:

performing a fuzzy inference calculation based on plural rules which have the starting position of the actuator and the target moving distance to be accessed by the actuator as input variables, and have a correction value of at least one of the acceleration, the acceleration time, the deceleration and the deceleration time represented by data of the access command signal as an output variable; and correcting the data of the access command signal based on the correction value obtained by the above fuzzy inference calculation.

3. An access control apparatus of an actuator comprising:

a driving means for driving the actuator;

a position detection means for detecting a position of the actuator;

a fuzzy inference calculation means for performing a fuzzy inference calculation based on plural rules, which receives an access command signal including data of an acceleration, an acceleration time, a deceleration and a deceleration time of the actuator, said plural rule having the acceleration, the acceleration time, the deceleration and the deceleration time represented by the access command signal and a starting position of the actuator as input variables, and having a correction value of at least one of the acceleration, the acceleration time, the deceleration and the deceleration time represented by data of the access command signal as an output variable; and a driving signal generation means which corrects the data of the access command signal based on the correction value obtained by the fuzzy inference calculation means and generates a driving signal including data of an acceleration, an acceleration time, a deceleration and a deceleration time of the actuator in order to move the actuator for a predetermined target moving distance.

4. An access control apparatus of an actuator comprising:

a driving means for driving the actuator;

a position detection means for detecting a position of the actuator;

a fuzzy inference calculation means for performing a fuzzy inference calculation based on plural rules, which receives an access command signal including data of an acceleration, an acceleration time, a deceleration and a deceleration time of the actuator, said plural rule having a starting position of the actuator and a target moving distance of the actuator as input variables, and having a correction value of at least one of the acceleration, the acceleration time, the deceleration and the deceleration time represented by data of the access command signal as an output variable; and a driving signal generation means which corrects the data of the access command signal based on the correction value obtained by the fuzzy inference calculation means and generates a driving signal including data of an acceleration, an acceleration time, a deceleration and a deceleration time of the actuator in order to move the actuator for a predetermined target moving distance.

* * * * *

UNITED STATES PATENT AND TRADEMARK OFFICE
CERTIFICATE OF CORRECTION

PATENT NO. : 5,267,144
DATED : November 30, 1993
INVENTOR(S) : Shuichi YOSHIDA et al.

It is certified that error appears in the above-indentified patent and that said Letters Patent is hereby corrected as shown below:

On the Title Page, Item [75], change "Shuich" to --Shuichi--.

Signed and Sealed this

Twenty-first Day of June, 1994

Attest:

BRUCE LEHMAN

*Attesting Officer*     *Commissioner of Patents and Trademarks*